March 2, 1954 H. W. MACKEY 2,670,531
APPARATUS FOR SETTING GLASS PANELS
Filed March 21, 1949 16 Sheets-Sheet 1
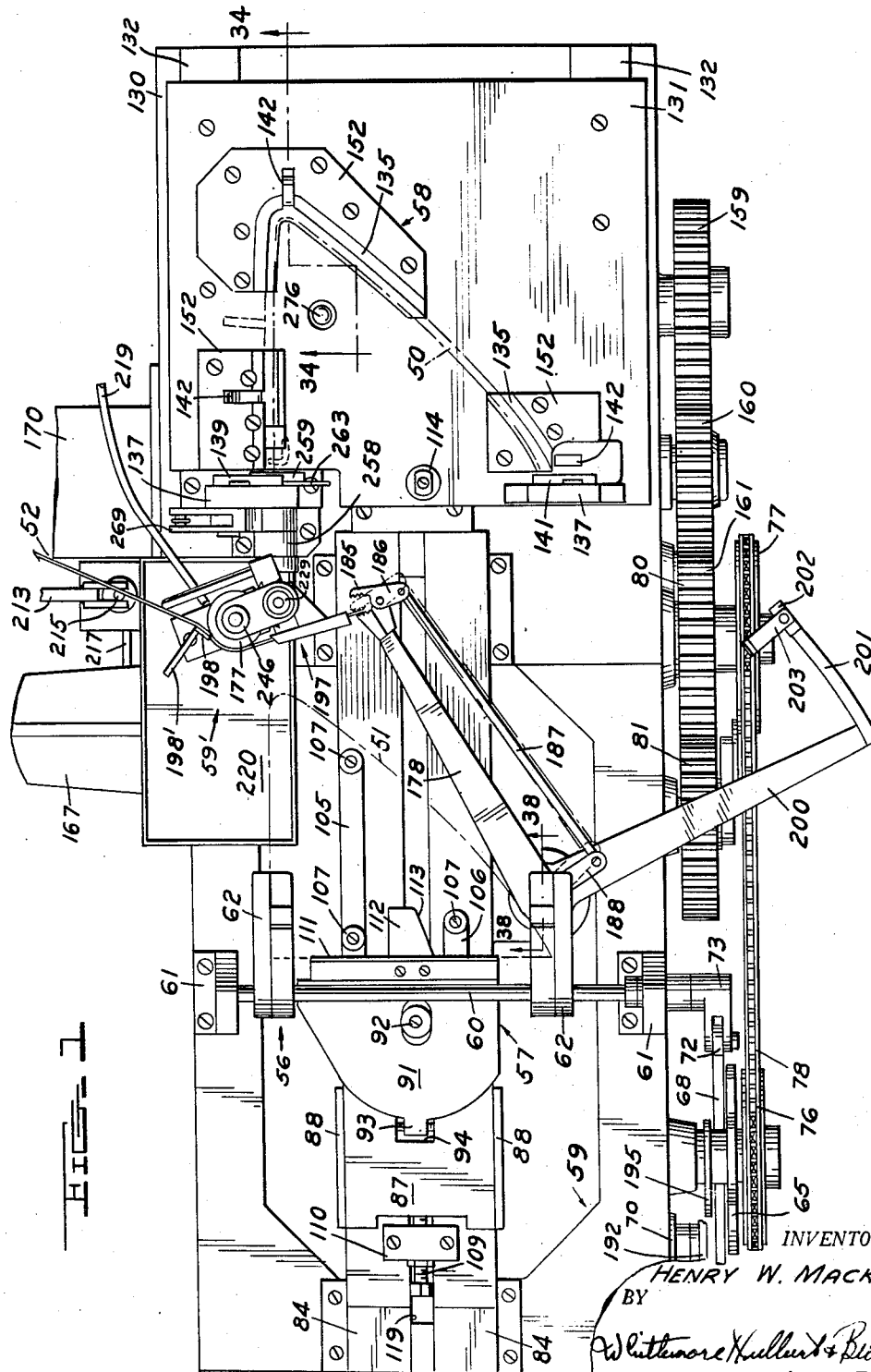
INVENTOR.
HENRY W. MACKEY
BY
ATTORNEYS

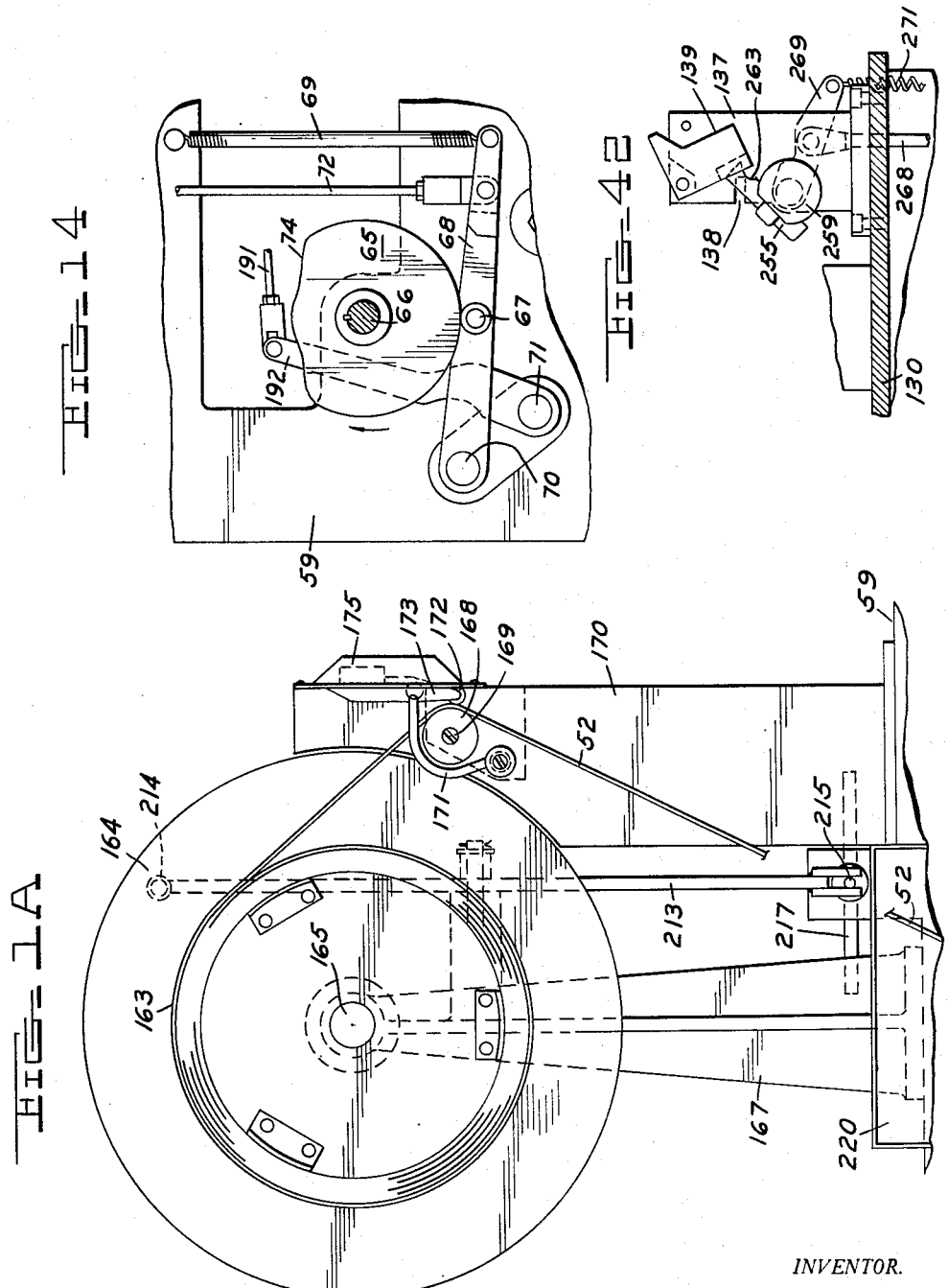

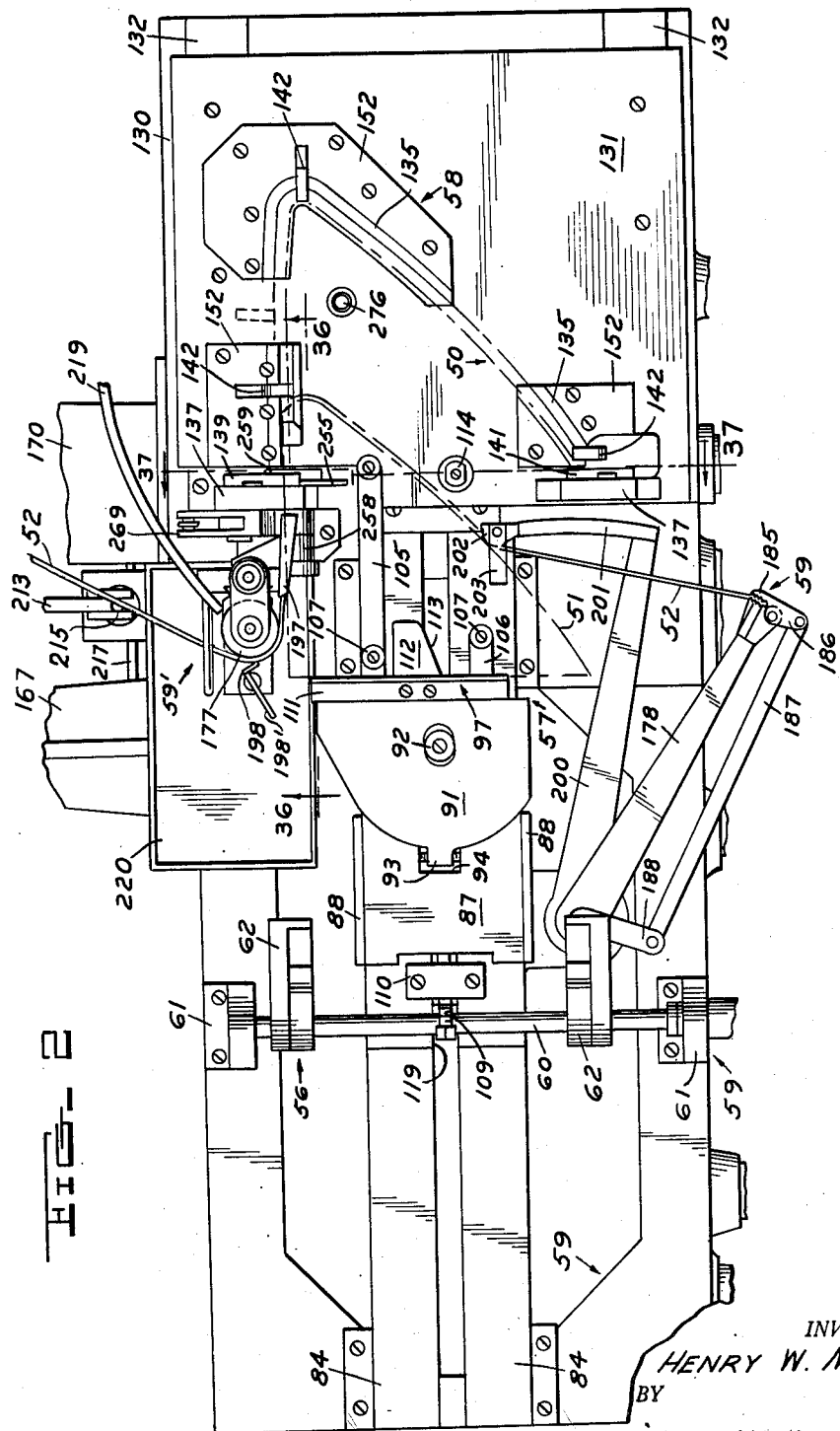

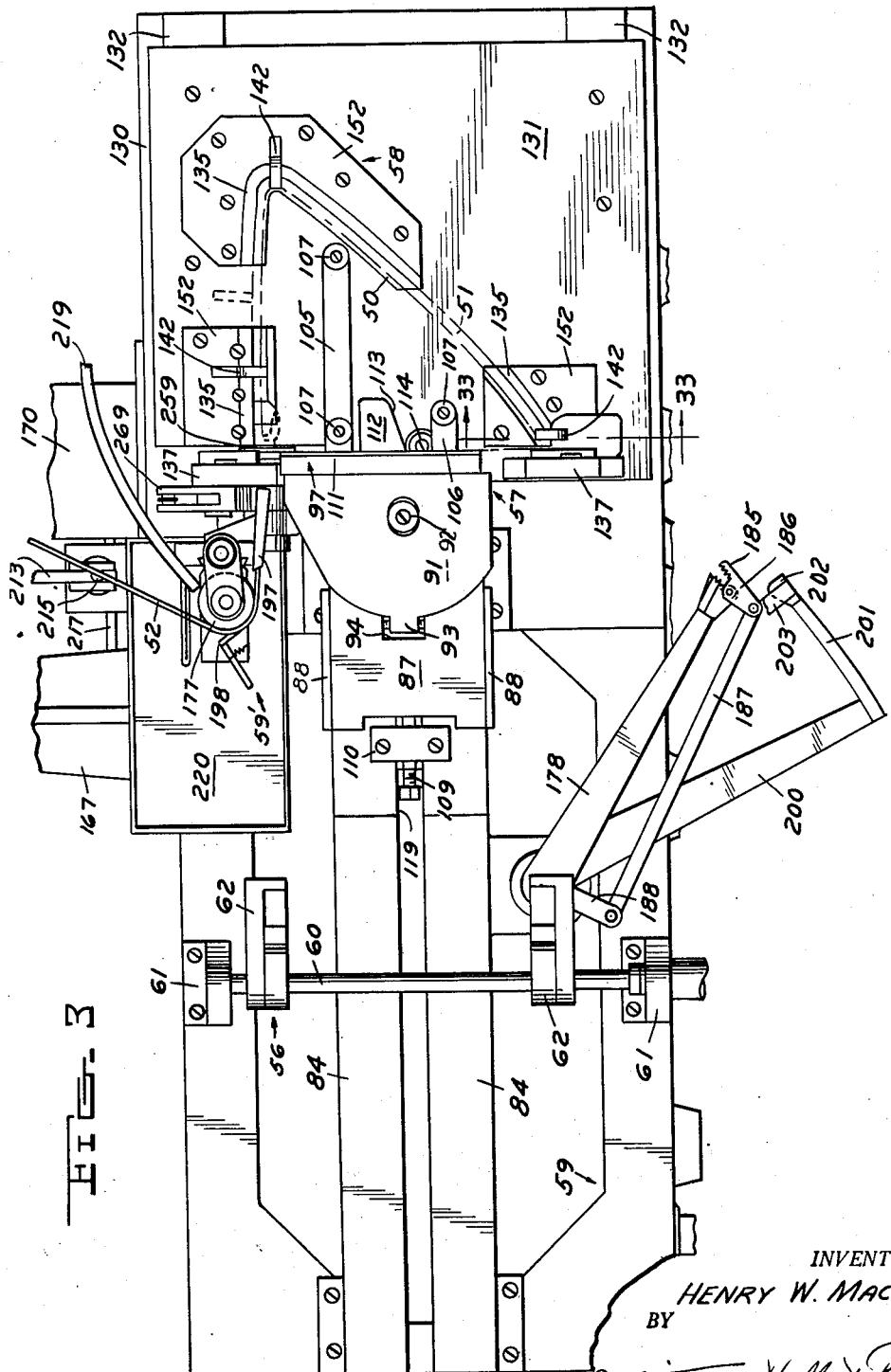

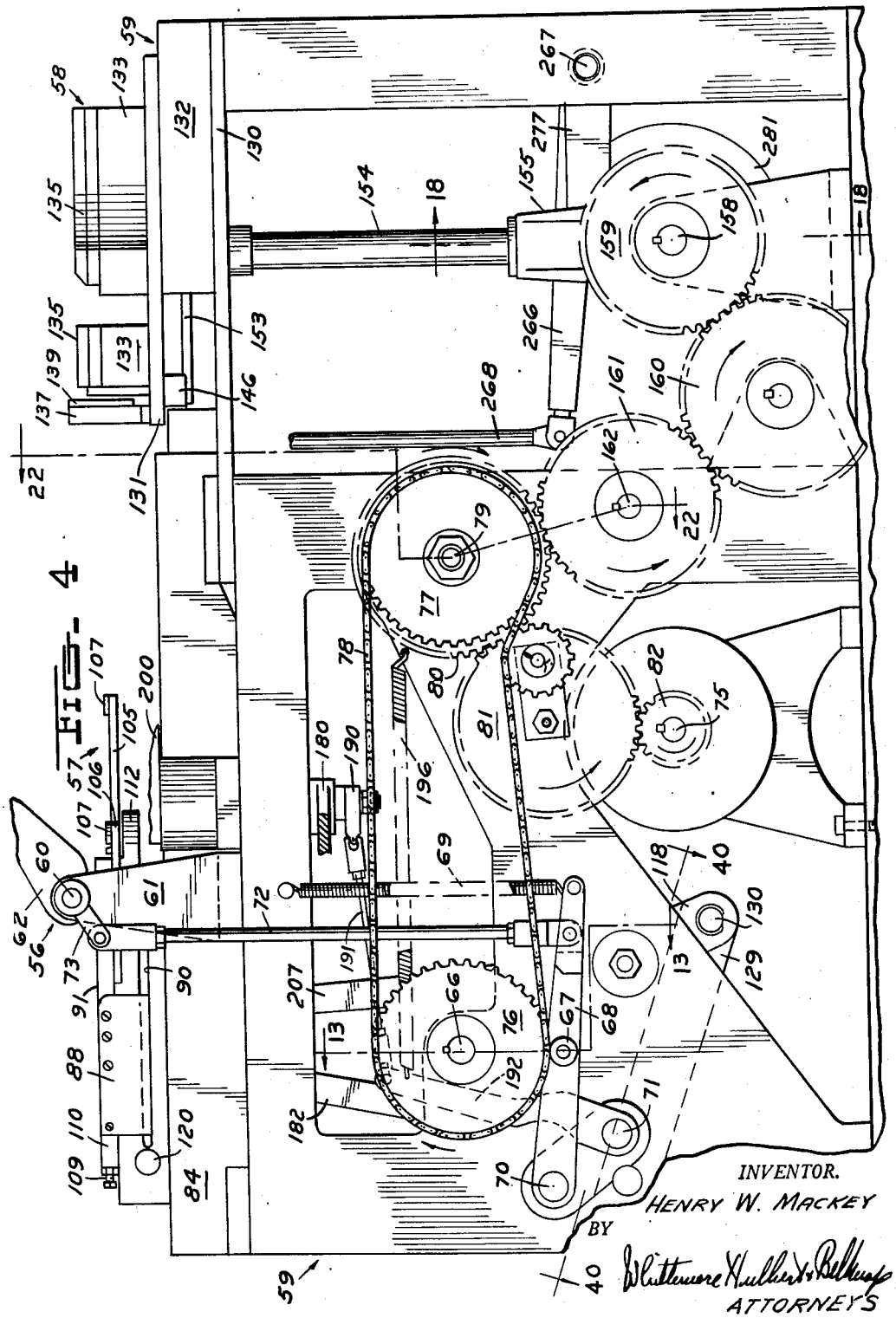

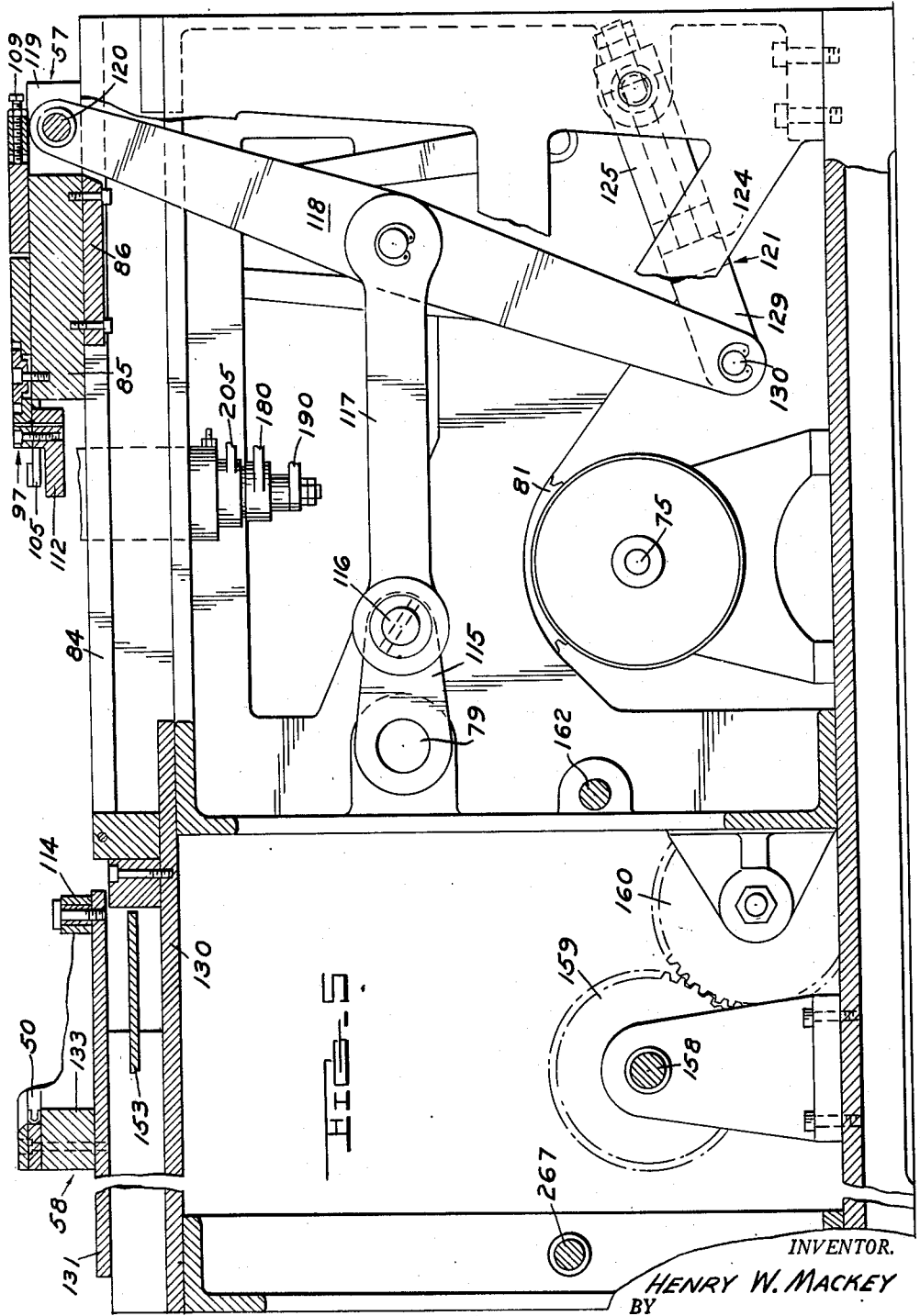

March 2, 1954 H. W. MACKEY 2,670,531
APPARATUS FOR SETTING GLASS PANELS
Filed March 21, 1949 16 Sheets-Sheet 7
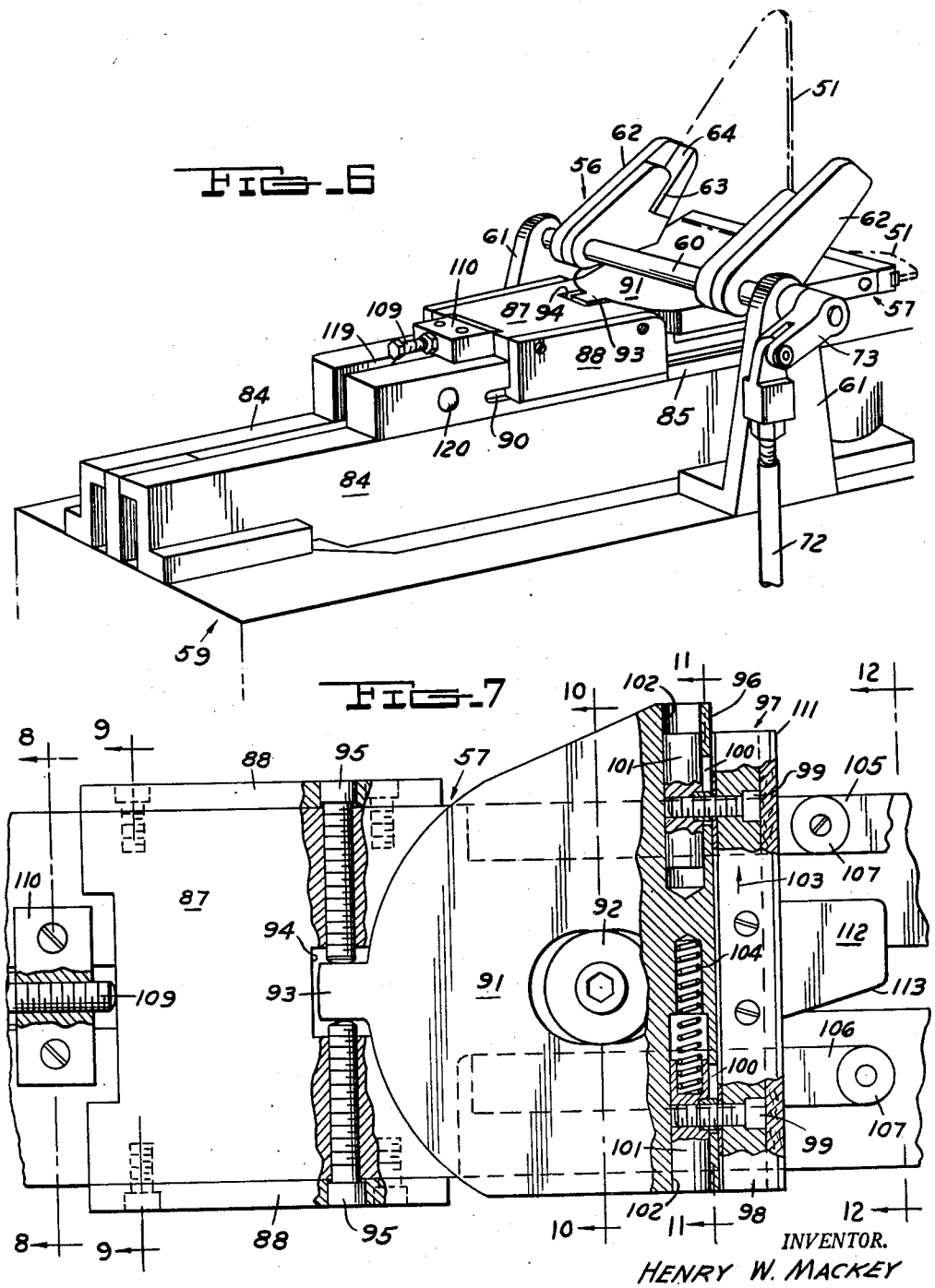
INVENTOR.
HENRY W. MACKEY
BY
ATTORNEYS

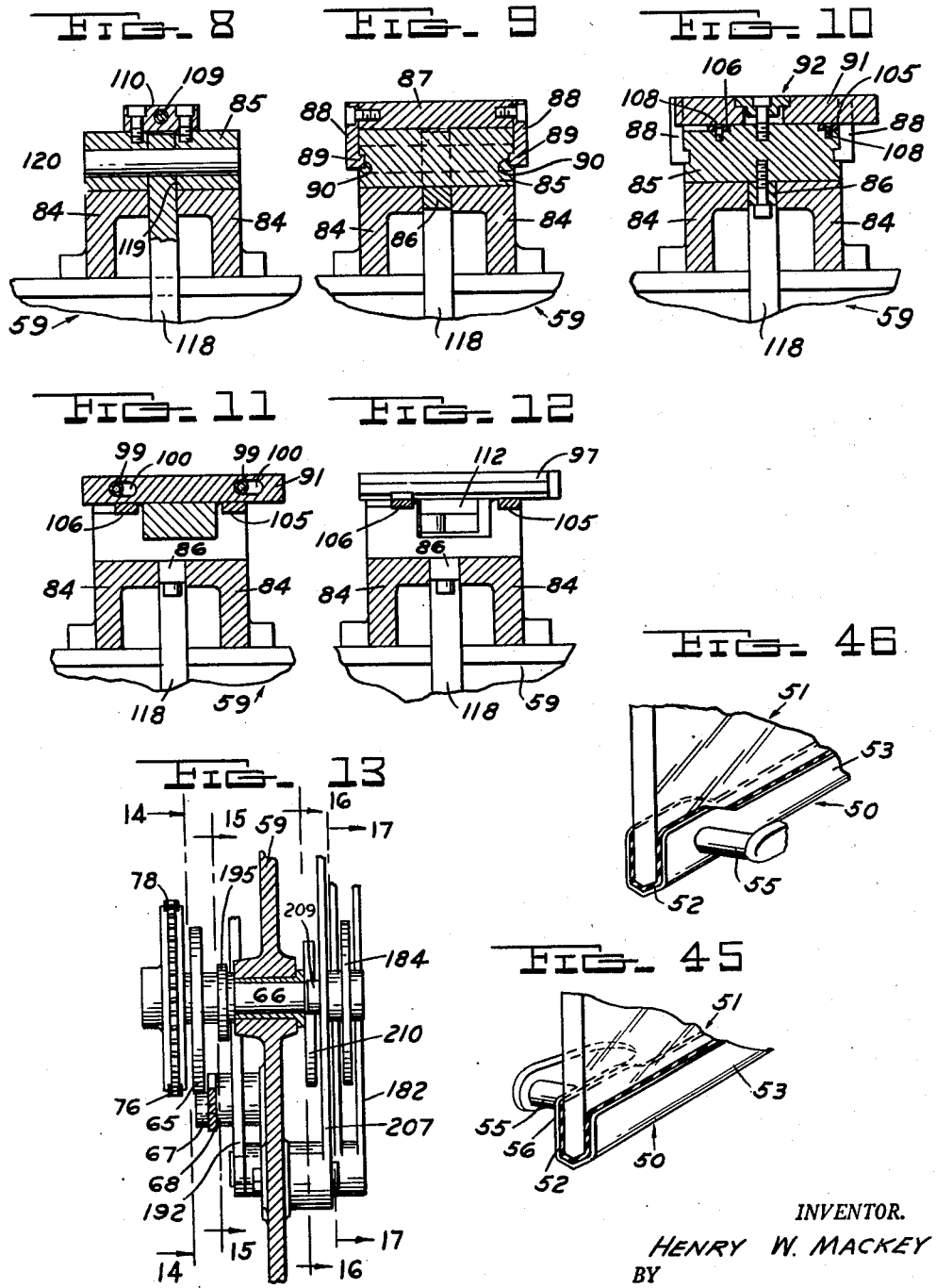

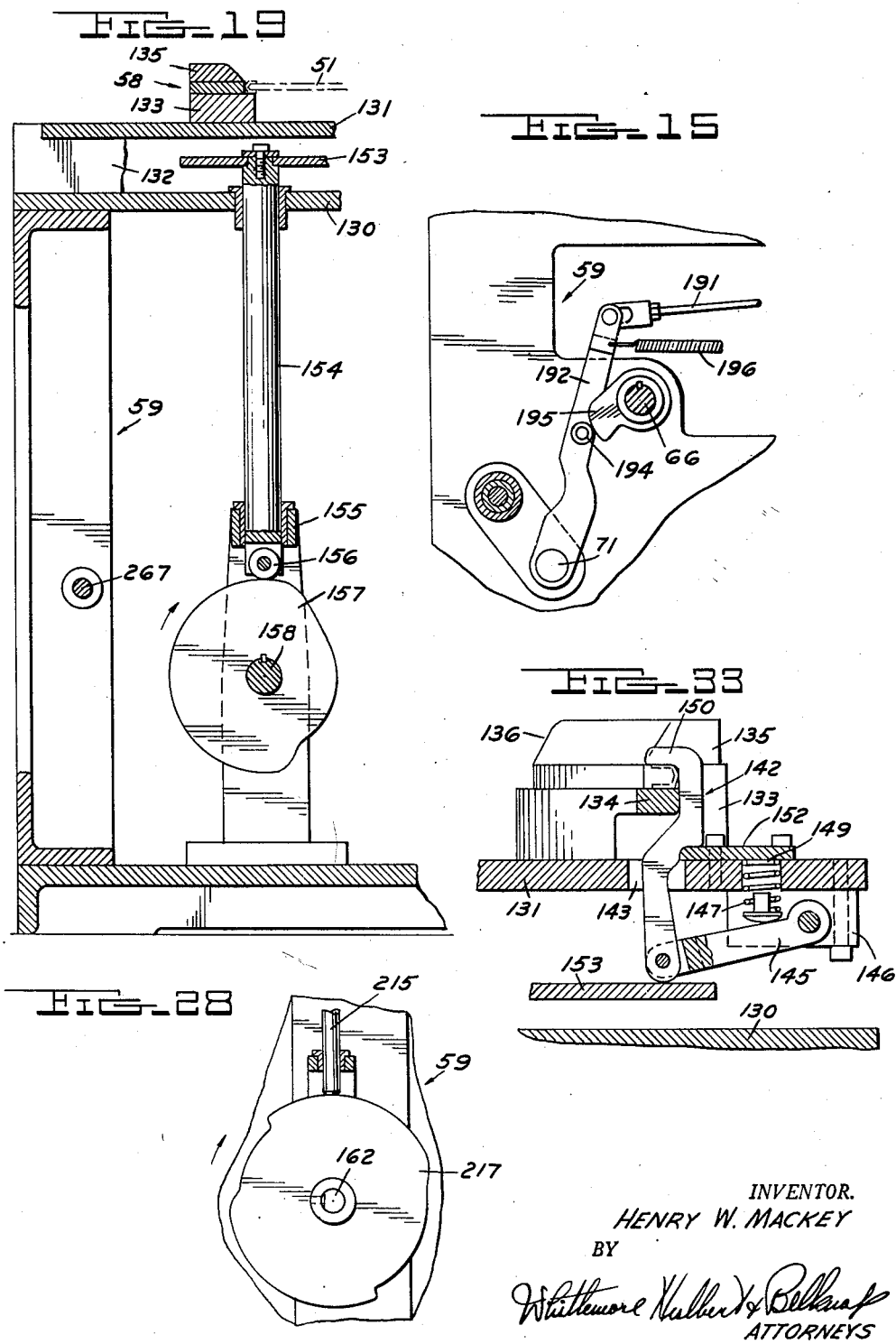

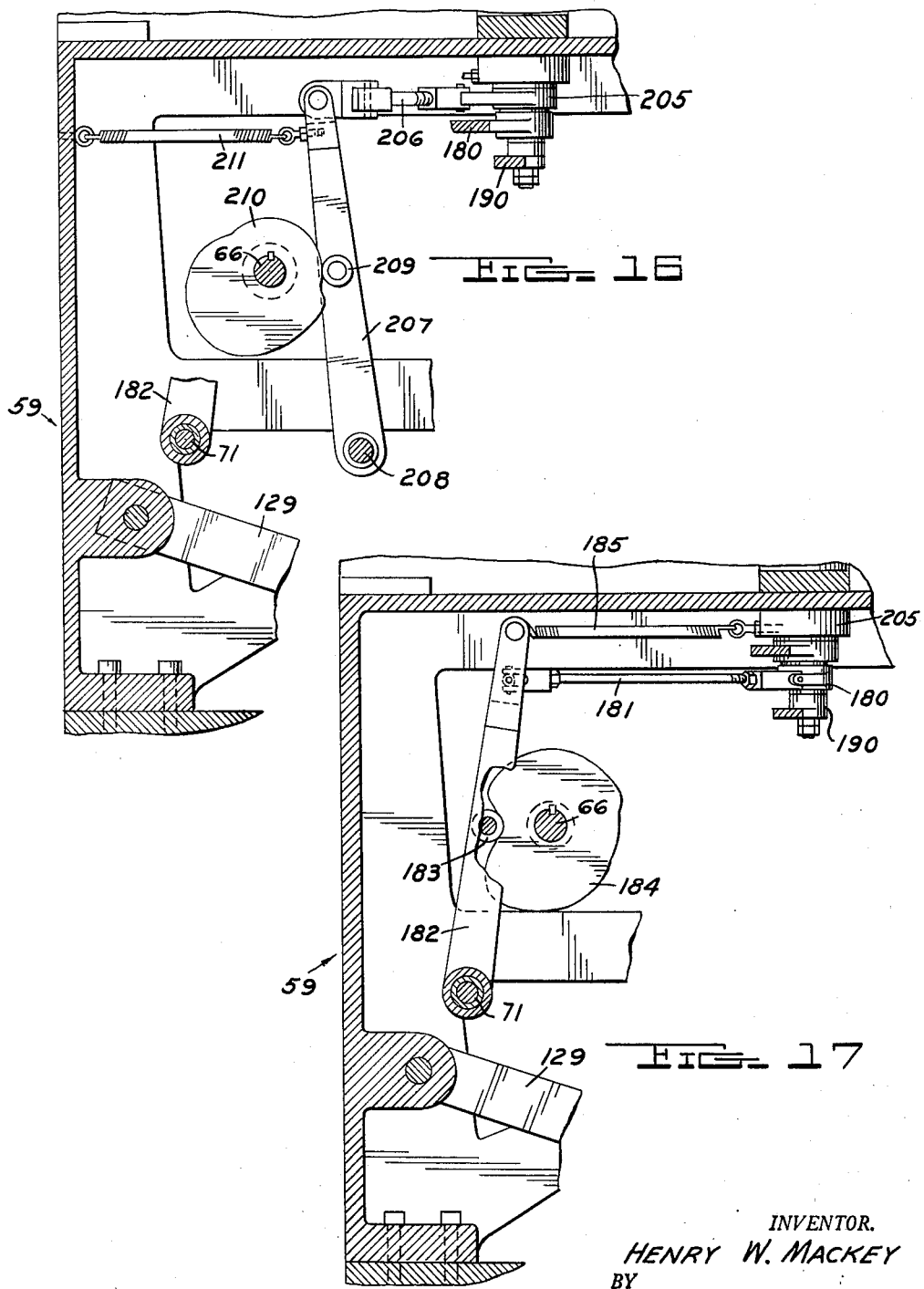

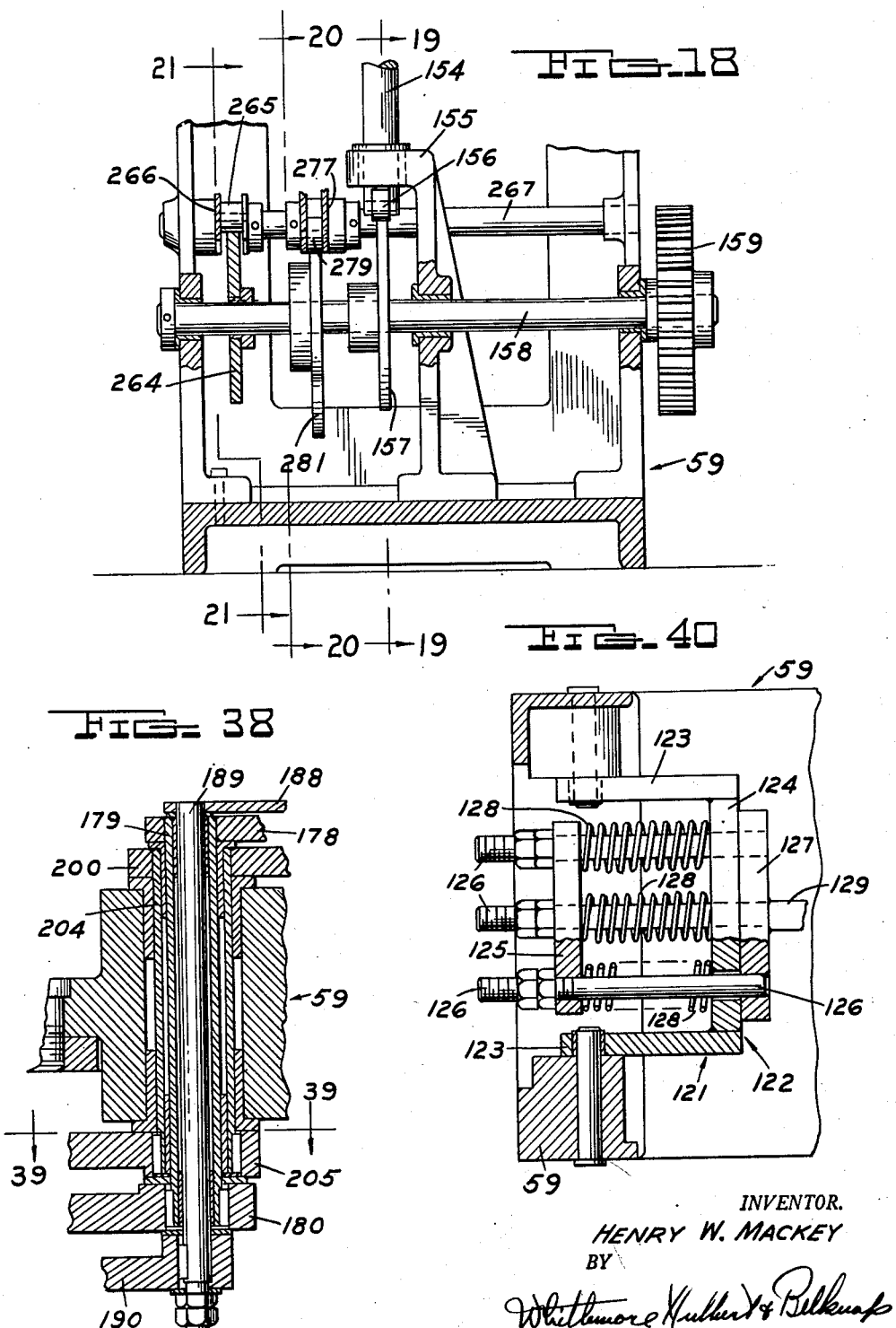

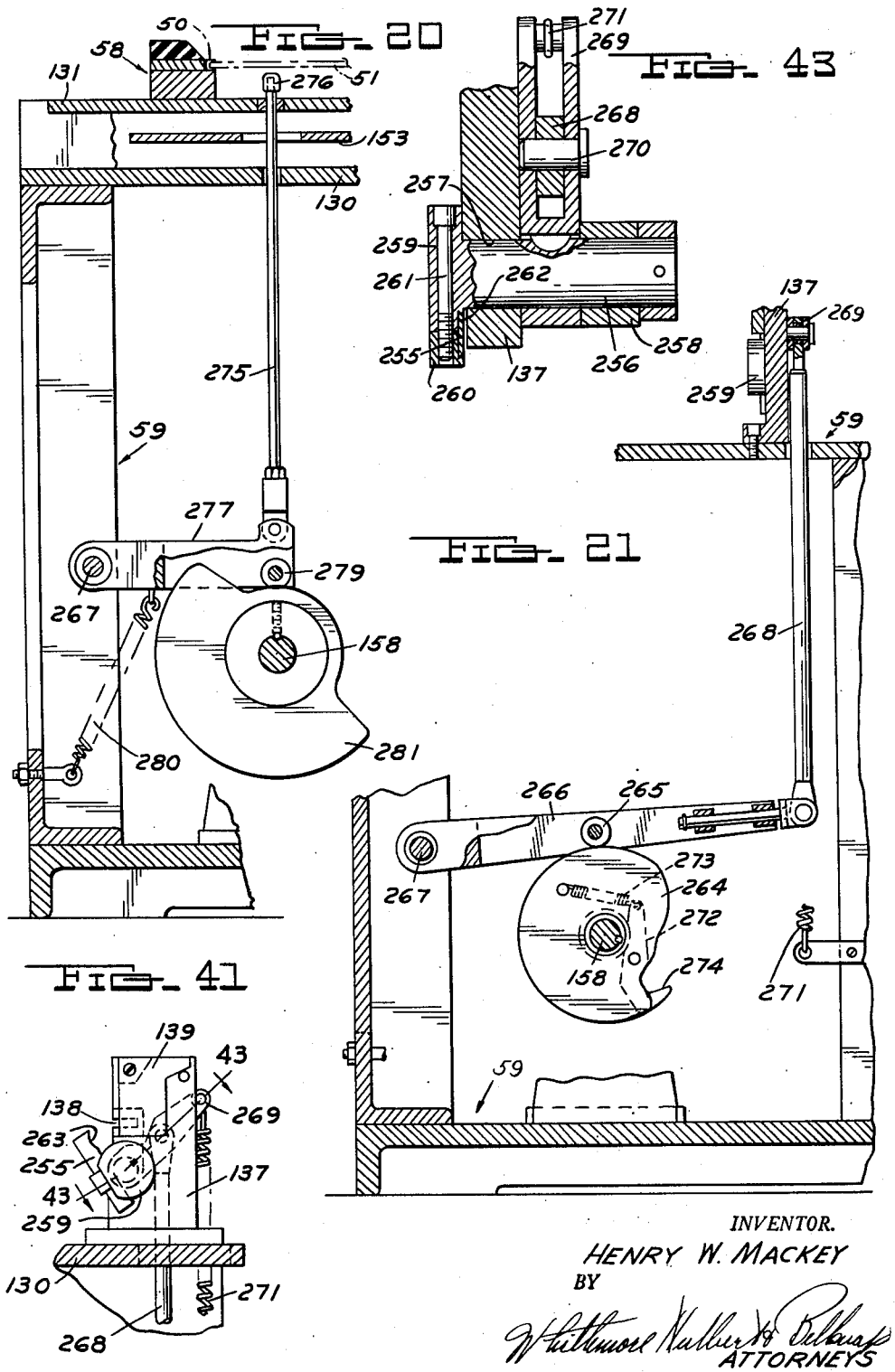

March 2, 1954 H. W. MACKEY 2,670,531
APPARATUS FOR SETTING GLASS PANELS
Filed March 21, 1949 16 Sheets-Sheet 13
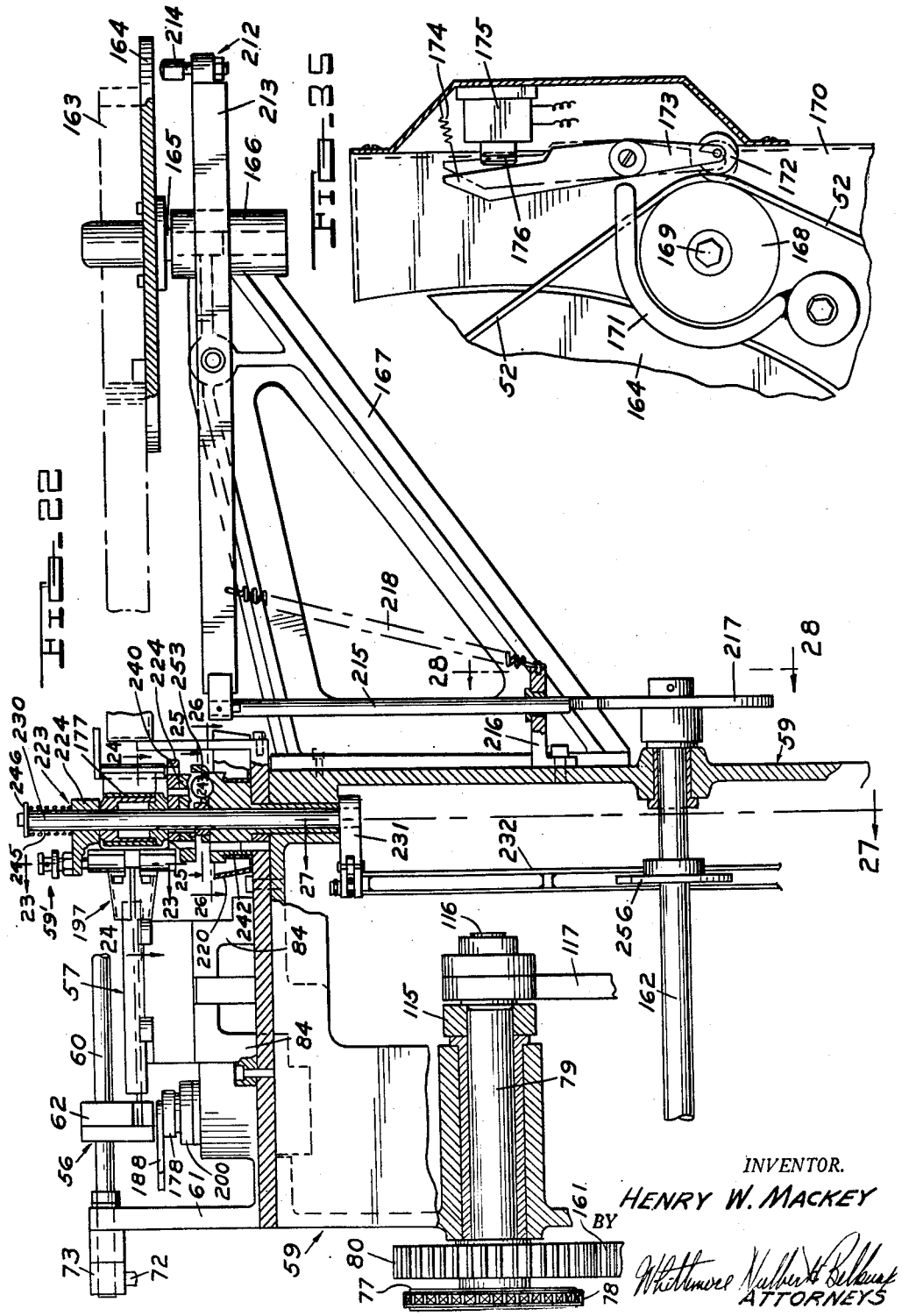
INVENTOR.
HENRY W. MACKEY
BY
ATTORNEYS March 2, 1954  H. W. MACKEY  2,670,531
APPARATUS FOR SETTING GLASS PANELS
Filed March 21, 1949  16 Sheets-Sheet 14
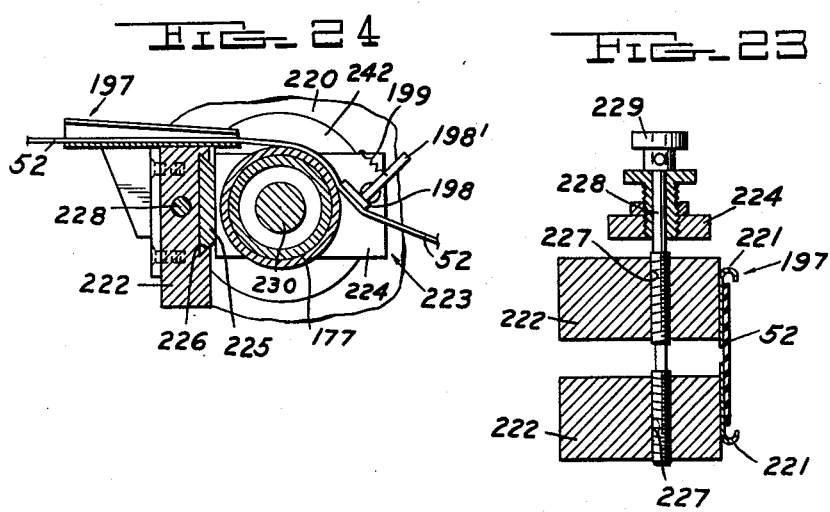
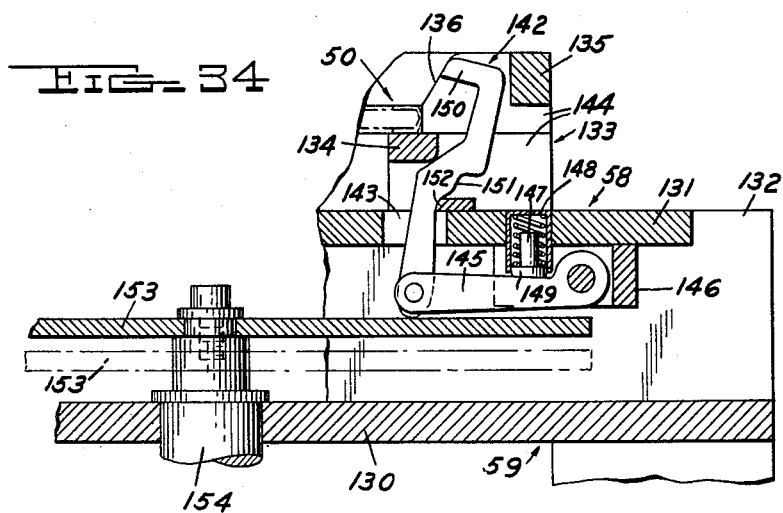
INVENTOR.
HENRY W. MACKEY
BY
ATTORNEYS March 2, 1954　　　H. W. MACKEY　　　2,670,531
APPARATUS FOR SETTING GLASS PANELS
Filed March 21, 1949　　　16 Sheets-Sheet 15
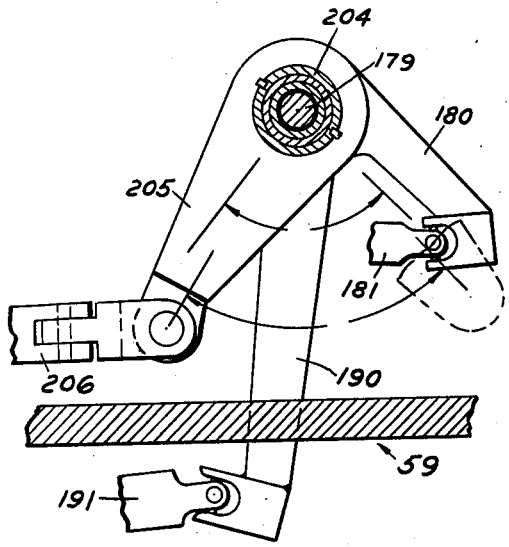
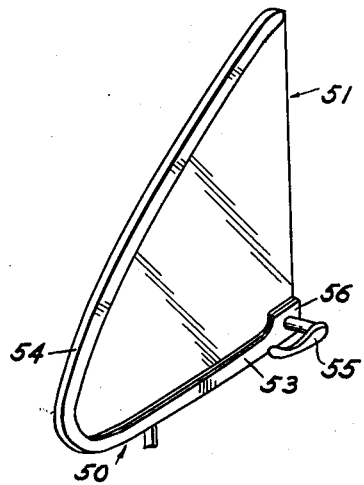
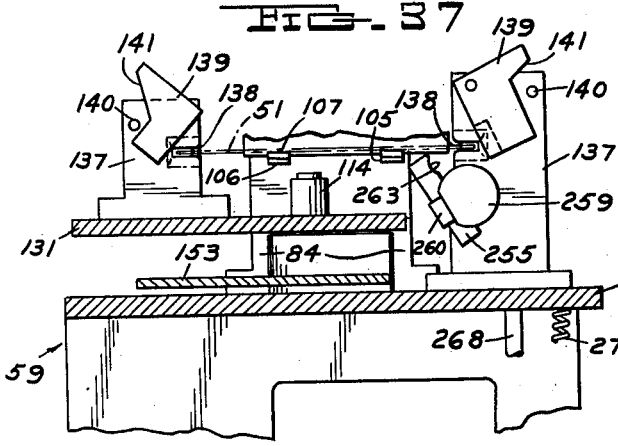
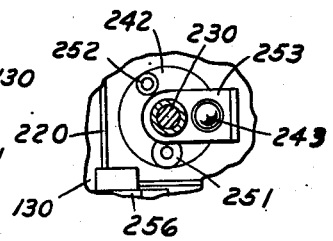
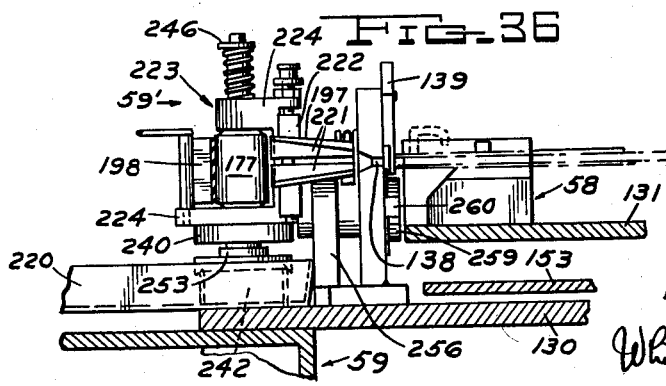
INVENTOR.
HENRY W. MACKEY
BY
ATTORNEYS March 2, 1954 H. W. MACKEY 2,670,531
APPARATUS FOR SETTING GLASS PANELS
Filed March 21, 1949 16 Sheets-Sheet 16
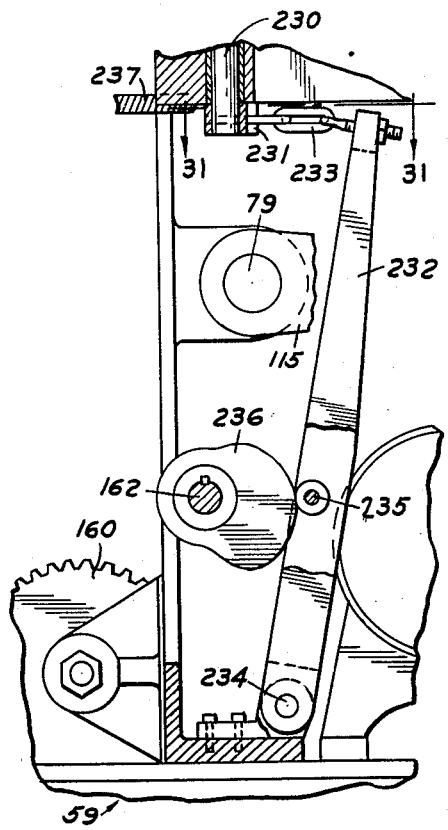
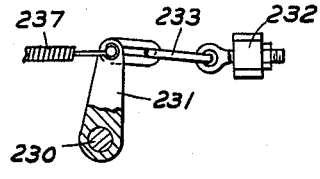
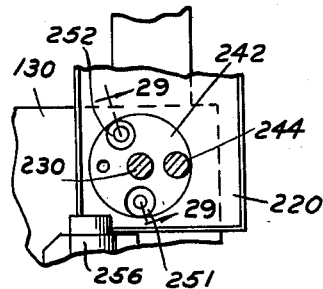
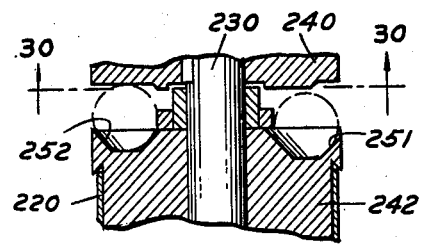
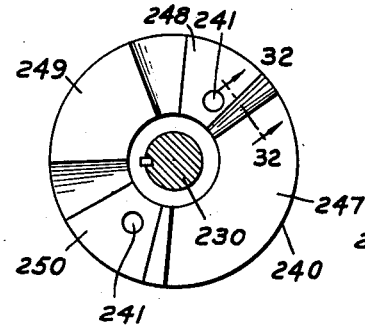
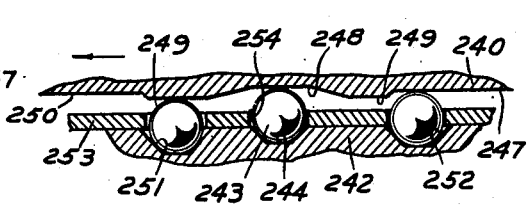
INVENTOR.
HENRY W. MACKEY
BY
ATTORNEYS Patented Mar. 2, 1954

2,670,531

UNITED STATES PATENT OFFICE 2,670,531

APPARATUS FOR SETTING GLASS PANELS

Henry W. Mackey, Detroit, Mich., assignor to Motor Products Corporation, Detroit, Mich., a corporation of New York Application March 21, 1949, Serial No. 82,671

20 Claims. (Cl. 29—200)

This invention relates to apparatus for setting a panel in a frame and for inserting a sealing strip in the frame around the marginal edge of the panel.

More particularly the invention concerns itself with the manufacture of vehicle body window ventilators comprising a frame and a glass or transparent panel. The frame usually has a bottom bar and a front bar which ordinarily extends rearwardly in an arcuate path from the front end of the bottom bar to also form the top of the frame. The rear side of the frame is open and the frame bars are channel-shaped in cross section to freely receive the glass panel. The clearance space between the marginal edges of the panel and the adjacent bars of the frame is weather sealed by a resilient strip extending for substantially the full length of the frame bars and also channel-shaped in cross section to embrace the marginal edges of the panel within the frame.

It has been the custom to set the glass panel in the frame and to install the weather strip by hand methods. In practice a strip of weather sealing material preformed to the desired length is wrapped around the side edges of the glass panel to be engaged by the frame and the panel is manually inserted into the frame through the open rear side thereof while the sealing strip is held in place. The arrangement is such that the sealing strip is deformed into channel-shaped configuration during assembly of the panel into the frame, and is wedged into the clearance space provided in the channel frame bars around the marginal edges of the glass panel. This method of assembly requires a considerable number of man hours where ventilators are produced on a large production basis, and is largely responsible for the relatively high cost of manufacture.

With the above in view, it is one of the objects of this invention to greatly reduce the cost of assembly of ventilators of the type noted by providing a machine which operates automatically to insert the glass panel in the frame, and at the same time, install the weather strip in place. In accordance with this invention a glass panel and the frame therefor are supported in spaced relationship in a common horizontal plane with the open rear side of the frame facing the front edge of the glass panel. The glass panel is moved toward the frame while supported in the same plane as the frame and ultimately assumes a position within the frame. Prior to movement of the glass panel into the frame a flexible weather strip of the proper width is extended across the path of travel of the glass panel between the latter and frame in a position to be engaged by the front edge portion of the panel as it moves toward the frame. Thus the weather strip is folded along opposite sides of the panel and finally is deformed to assume a channel-shaped configuration within the channel-shaped bars of the frame to provide a seal around the panel.

It is another object of this invention to provide means for feeding a predetermined length of weather strip transversely across the path of travel of the panel in timed relation to movement of the panel in a direction toward the frame.

Still another object of this invention is to provide a guide engageable with the sealing strip as it is drawn across the path of travel of the glass panel to locate the strip in a position to be engaged along a line intermediate the opposite longitudinal edges by the front edge of the panel as it is advanced toward the frame.

It is a further object to provide a guide supported to one side of the path of travel of the glass panel adjacent the bottom edge of the latter and shaped to fold the strip over the bottom edge of the panel as it is advanced in a direction toward the frame.

There are certain types of ventilator windows having a latch operating handle pivotally supported at the inner side of the ventilator on the inner flange of the frame, and in many instances, it is customary to increase the width of the inner flange at the point of pivotal connection of the latch handle. This also necessitates correspondingly increasing the width of the inner flange of the weather strip during assembly, and it is a further object of this invention to provide means for adjusting the guide to locate a greater width of the strip at either side of the plane of the glass panel depending upon whether right or left hand ventilators are being assembled.

The foregoing as well as other objects will be made more apparent as this description proceeds, especially when considered in connection with the accompanying drawings, wherein:

Figure 1 is a plan view of a part of the apparatus forming the subject matter of this invention;

Figure 1A is a plan view of another part of the apparatus;

Figure 2 is a plan view similar to Figure 1 showing the parts in another position;

Figure 3 is a plan view similar to Figure 2 showing the parts in still another position;

Figure 4 is an elevational view of the front side of the apparatus shown in Figure 1;

Figure 5 is an elevational view partly in section of the rear side of the apparatus shown in Figure 1;

Figure 6 is a fragmentary perspective view of a part of the apparatus;

Figure 7 is an elevational view partly in section of the construction shown in Figure 6;

Figures 8, 9, 10, 11 and 12 are cross sectional views taken respectively on the lines 8—8, 9—9, 10—10, 11—11 and 12—12 of Figure 7;

Figure 13 is a sectional view taken on the line 13—13 of Figure 4;

Figures 14, 15, 16 and 17 are cross sectional views taken respectively on the lines 14—14, 15—15, 16—16 and 17—17 of Figure 13;

Figure 18 is a sectional view taken on the line 18—18 of Figure 4;

Figures 19, 20 and 21 are respectively cross sectional views taken on the lines 19—19, 20—20 and 21—21 of Figure 18;

Figure 22 is a sectional view taken on the line 22—22 of Figure 4;

Figures 23, 24, 25, 26, 27 and 28 are sectional views taken respectively on the lines 23—23, 24—24, 25—25, 26—26, 27—27 and 28—28 of Figure 22;

Figure 29 is a sectional view taken on the line 29—29 of Figure 26;

Figure 30 is a sectional view taken on the line 30—30 of Figure 29;

Figure 31 is a sectional view taken on the line 31—31 of Figure 27;

Figure 32 is a sectional view taken on the line 32—32 of Figure 30;

Figure 33 is a sectional view taken on the line 33—33 of Figure 3;

Figure 34 is a sectional view taken on the line 34—34 of Figure 1;

Figure 35 is an enlarged elevational view partly in section of the switch assembly shown in Figure 1A;

Figure 36 is a sectional view taken on the line 36—36 of Figure 2;

Figure 37 is a sectional view taken on the line 37—37 of Figure 2;

Figure 38 is a sectional view taken on the line 38—38 of Figure 1;

Figure 39 is a sectional view taken on the line 39—39 of Figure 38;

Figure 40 is a sectional view taken on the line 40—40 of Figure 4;

Figure 41 is a fragmentary sectional view of the cutoff means showing the knife in its inoperative position;

Figure 42 is a view similar to Figure 41 showing the knife in its operative position;

Figure 43 is a sectional view taken on the line 43—43 of Figure 41;

Figure 44 is a perspective view of a ventilator panel in connection with which the apparatus is to be used;

Figure 45 is a fragmentary perspective view of the part of the ventilator shown in Figure 44 having a latch operating arm; and Figure 46 is a fragmentary perspective view of a slightly different type of ventilator also capable of being assembled with the apparatus forming the subject matter of this invention.

Although the apparatus disclosed herein may be successfully used in assembling various different products, nevertheless, it is primarily adapted for use in the manufacture of vehicle body ventilator windows. A typical ventilator window capable of being assembled by the apparatus is shown in Figures 44 and 45 of the drawings. This ventilator window comprises a frame 50, a glass panel 51 and a weather sealing strip 52. The frame 50 is of one piece construction, bent or otherwise formed to provide a bottom bar 53 and a front bar 54. It will be noted that the front bar 54 extends rearwardly from the front end of the bottom bar 53 along an arcuate path, and also forms the top bar or side of the frame 50.

The rear side of the frame 50 is open and the bars making up the frame are channel-shaped in cross section. The glass panel 51 is preformed to correspond in shape to the contour of the frame, and engages within the channel-shaped bars of the frame. The glass panel 51 is securely held in the frame by the strip 52, which is also channel-shaped in cross section and extends for the full length of the frame bars. In manufacture the strip 52 is assembled in the channel of the frame 50 by the movement of the glass panel 51 into the channel through the open rear end of the frame. The dimensions of the parts are such that the strip 52 is actually wedged in position and acts as a weather seal around the marginal edge of the glass panel.

In accordance with orthodox practice, a latch operating handle 55 is secured to the inner flange of the frame 50, and in the present instance, is located at the rear end of the bottom bar 53 of the frame. In order to accommodate the operating handle 55, the width of the inner flange on the bottom bar 53 of the ventilator frame 50 is somewhat increased as indicated by the numeral 56. As shown in Figure 45 of the drawings the inner flange of the channel-shaped weather strip 52 is also increased in width to correspond with the portion 56 of the frame. This particular type of construction is illustrated because it necessitates extending the inner side or flange of the weather strip beyond the outer side flange during movement and provision is made in the apparatus about to be described for accomplishing this result.

The window ventilator shown in Figure 46 of the drawings differs from the one previously described in that both the inner and outer flanges of the bottom bar of the frame are correspondingly increased in width at the rear end of the bar to accommodate the operating handle. With this design the weather strip may be symmetrically positioned relative to the marginal edge of the glass panel during assembly, as it is not necessary to provide a greater width of strip on one side than on the other. Attention is also called to the fact that the ventilator window shown in Figure 46 is of the left-hand type, whereas the ventilator shown in Figure 45 is of the right-hand type. With the above exceptions the two constructions are identical and like reference characters are used to designate corresponding parts.

In general the apparatus comprises a glass panel supporting fixture 56, a slide or carriage 57 for the glass panel, a frame holding fixture 58, operating mechanism 59' for the sealing strip 52 and frame structure 59 for supporting all of the above assemblies. As shown particularly in Figure 5 of the drawings, the holding fixture 58 for the ventilator frame 50 is secured to the frame structure 59 adjacent the front end of the latter, and at the start of the cycle of operation of the apparatus, the slide 57 for the glass panel 51 is positioned on the frame structure 59 adjacent the rear end of the latter.

It will further be noted from Figures 1 and 5 of the drawings that the holding fixture 58 supports the ventilator frame 50 in a horizontal plane with the open rear end of the frame 50 facing the slide 57. The slide 57, on the other hand, supports the glass panel 51 in the horizontal plane of the ventilator 50 with the front edge of the panel facing the rear open side of the ventilator frame and positioned to extend into the ventilator frame upon movement of the slide 57 toward the fixture 58.

During initial advancement of the slide 57 toward the holding fixture 58, the mechanism 59' operates to pull a length of weather stripping 52 across the path of travel of the glass panel 51 between the latter and the frame 50, as shown in Figure 2 of the drawings. The arrangement is such that the strip 52 is engaged at approximately its longitudinal center line by the front edge of the glass panel 51 as the latter continues to advance toward the frame 50. Thus during the final movement of the slide 57 to set the glass panel 51 into the frame 50, the weather strip 52 is folded about the adjacent marginal edges of the panel, and is forced into the ventilator frame 50 to assume the location previously described. The ventilator window assembly is then removed from the holding fixture, and the slide 57 returns to its initial starting position in readiness for the next cycle of operation.

*Glass panel supporting fixture*

The glass panel supporting fixture is best shown in Figures 6, 13 and 14. This feature embodies a shaft 60 extending transversely of the machine frame 59 adjacent the front end of the latter and having the opposite ends respectively journalled in brackets 61 secured to the machine frame. Secured to the shaft 60 in spaced relationship axially of the shaft is a pair of arms 62 having slots 63 extending lengthwise of the arms from the free ends thereof. The slots 63 are of sufficient dimension to freely receive the opposite marginal edge portions of the glass panel 51 and serve to hold the latter in position on the arms. The bottom walls 64 of the slots project beyond the opposite top walls to provide bearing surfaces for guiding the glass panel into the slots 63. The arms 62 extend toward the front end of the machine and are inclined in an upward direction to hold the glass panel 51 in the position thereof shown in Figure 6 of the drawings.

The shaft 60 is rotated in a direction to swing the glass panel 51 downwardly into engagement with the operating slide 57 by a cam 65 shown in Figures 13 and 14 of the drawings as secured to a shaft 66. The cam 65 is engaged by a follower 67 supported directly below the periphery of the cam 65 on an arm 68 intermediate the ends of the latter. The follower 67 is yieldably held in contact with the periphery of the cam 65 by a spring 69 having the lower end connected to the front end of the arm 68 and having the upper end suitably anchored on the main frame 59. The rear end of the arm 68 is pivotally connected to the frame 59 by a pin 70.

The arm 68 is also connected to the shaft 60 for rocking the latter by a rod 72 having the lower end pivoted to the arm 68 adjacent its front or free end and having the upper end pivoted to one end of a link 73. The opposite end of the link 73 is secured to the shaft 60 and imparts a rotative movement to the shaft in response to rotation of the cam 65. As shown particularly in Figure 4 of the drawings the peripheral contour of the cam 65 is determined to effect a swinging movement of the arms 62 downwardly and upwardly throughout one complete revolution of the cam. More particularly it will be noted that the peripheral surface of the cam 65 which effects downward swinging movement of the arms 62 is indicated in Figure 14 of the drawings by the numeral 74, and this surface is of a contour to maintain the arms 62 in their lowermost positions for a period of time sufficient only to enable the slide 57 to advance the glass panel 51 out of engagement with the arms 62.

The shaft 66 is journalled in a part of the machine frame 59 below the fixture 56, and is connected to a drive shaft 75 shown in Figure 4 of the drawings. In detail a sprocket wheel 76 is secured to the shaft 66 and is connected to a sprocket wheel 77 by a chain 78. The sprocket wheel 77 is secured to a transverse shaft 79 shown in Figure 22 of the drawings as journalled on the machine frame and as having a gear 80 secured thereto adjacent the sprocket wheel 77. Referring again to Figure 4 of the drawings, it will be noted that the gear 80 meshes with an intermediate gear 81 suitably journalled on the machine frame 59 in a position to mesh with a pinion 82, which in turn, is secured to the drive shaft 75. Thus the cam shaft 66 as well as the shaft 79 is rotated by the drive shaft 75.

*Glass panel operating slide*

The glass panel operating slide 57 is shown in Figures 7 to 12 inclusive. The slide 57 is supported on the machine frame 59 below the fixture 56, and the purpose of this slide is to disengage the glass panel 51 from the fixture 56 in the lowermost position of the arms 62, and to also advance the panel 51 toward the frame holding fixture 58. In detail the slide 57 embodies a support comprising laterally spaced rails 84 suitably secured to the main frame 59 and extending beneath the shaft 60. Slidably supported on the top surfaces of the rails 84 is a block 85 having a longitudinally extending key 86 secured to the bottom face thereof and extending between the rails 84 to hold the block 85 against lateral shifting movement relative to the rails.

Supported on the top surface of the block 85 adjacent the rear end thereof is a plate 87 having strips 88 suitably secured to opposite longitudinal edges thereof and projecting downwardly along opposite sides of the block 85. As shown particularly in Figure 9 of the drawings the lower ends of the strips 88 are formed with laterally inwardly extending ribs 89, and these ribs respectively slidably engage in elongated grooves 90 formed in opposite sides of the block 85. The arrangement is such that the plate 87 may be moved longitudinally of the block 85, and the purpose of this movement will be presently described.

Positioned on the block 85 at the front end of the plate 87 is a second plate 91 having the central portion pivoted to the block 85 by a fastener element 92 shown in Figure 10 of the drawings, and permitting rotative movement of the plate 91 in a horizontal plane relative to the block 85. The plate 91 is arcuate in shape at the rear end, and has a bearing engagement with a correspondingly curved surface at the front end of the plate 87. As shown particularly in Figure 7 of the drawings, a lug 93 projects rearwardly from the arcuate surface of the plate 91 and extends into a recess 94 formed in the plate 87. The opposite sides of the lug 93 are respectively engaged by set screws 95 threadably engaging the plate 87 and having the head portions accessible through openings in the strips 88. The arrangement is such that by relatively rotating the set screws 95, it is possible to angularly adjust the plate 91 relative to the block 85 and the purpose of this adjustment will also be presently described.

The front face 96 of the plate 91 is normal to the path of sliding movement and forms a bearing for a bumper bar 97. The bumper bar 97 comprises a member 98 extending in the direction of length of the face 96 on the plate 91 and secured to the latter by screws 99. Referring again to Figure 7 of the drawings, it will be noted that the screws 99 extend rearwardly through transversely elongated slots 100 formed in the front side of the plate 91 and respectively threadably engage plungers 101. The plungers 101 are respectively freely slidably supported in bores 102 formed in the plate 91 at opposite side edges of the latter and having their axes extending parallel to the face 96 on the plate 91. The arrangement is such as to enable limited sliding movement of the bumper bar 97 along the face 96 of the plate 91, and the purpose of this sliding movement will become more apparent as this description proceeds. It will further be noted from Figure 7 of the drawings that sliding movement of the bumper bar 97 relative to the plate 91 in the direction of the arrow 103 is resisted by a coil spring 104 supported in the lowermost bore 102 shown in Figure 7 and engageable with the adjacent plunger 101.

Projecting forwardly from the bumper bar 97 on the slide 57 is a pair of laterally spaced arms 105 and 106. The arms are spaced laterally from each other and have rests 107 suitably secured to the top surfaces thereof. The rests 107 serve to engage the underside of the glass panel 51 when the latter is lowered by the fixture 56. It will be noted from Figure 1 of the drawings that the arm 105 is of greater length than the arm 106, and serves to support the lower edge portion of the glass panel 51 at points adjacent the front and rear edges of the panel. As shown in Figure 10 of the drawings, the rear ends of the arms 105 and 106 are respectively supported in recesses formed in the top surface of the block 85 at opposite sides of the latter, and are secured to the block 85 by fastener elements 108. Thus the arms 105 and 106 move as a unit with the slide block 85.

At the start of the cycle of operation of the apparatus the slide 57 is located in its rearwardmost position shown in Figures 1, 5 and 6 of the drawings. This position is so determined with respect to the fixture 56 that when the latter is operated to swing the arms 62 downwardly the glass panel 51 is deposited on the rests 107 with the rear edge of the panel 51 immediately adjacent the bumper bar 97. In order to assure proper location of the bumper bar 97 with respect to the rear edge of the glass panel 51, provision is made for adjusting the plate 91 relative to the slide block 85. This adjustment is accomplished by a screw 109 threadably engaging a block 110, which in turn is secured to the slide block 85 beyond the rear edge of the plate 87. As shown in Figure 7 of the drawings the front end of the screw 109 engages the rear edge of the plate 87, and rotation of this screw relative to the block 110 serves to move the bumper bar 97 on the plate 91 forwardly or rearwardly depending on the direction of rotation of the screw 109. Also it is important to locate the bumper bar 97 in parallel relationship to the rear edge of the glass panel 51, and this may be accomplished by adjusting the screws 95 to rotate the plate 91 about the fastener 92.

By reason of the foregoing the bumper bar 97 is in a position to immediately engage the rear edge of the glass panel 51 upon forward movement of the slide 57. In this connection it is pointed out that a strip 111 of resilient material may be secured to the front face of the member 98 to avoid chipping or breaking the glass panel by the bumper bar 97. As the slide 57 is moved forwardly to advance the glass panel 51 in a direction toward the frame holding fixture 58, the bottom edge of the panel is shifted laterally to assure aligning the same with the bottom bar 53 of the frame, and this is accomplished by shifting the bumper bar 97 in the direction of the arrow 103 against the action of the spring 104. Referring again to Figure 7 of the drawings, it will be noted that a lug 112 is secured to the underside of the bumper bar 97 intermediate the ends of the latter, and projects in a forward direction from the bumper bar. The lug 112 has a cam face 113 at one edge for engagement with a projection 114 on the machine frame. As shown in Figure 1 of the drawings the projection 114 is positioned immediately adjacent the rear side of the frame holding fixture 58, and coacts with the cam face 113 to urge the bottom edge of the glass panel 51 against the bottom bar 53 of the frame 50 which is supported on the fixture 58.

The slide 57 is operated by mechanism shown best in Figure 5 of the drawings. This mechanism embodies a crank arm 115 secured to the shaft 79 and having a pin 116 projecting laterally from the free end thereof. The pin 116 is pivotally connected to one end of a link 117, and the opposite end of the link is connected to a lever 118 intermediate the ends thereof. The upper end of the lever 118 extends into a recess 119 formed in the rear end of the block 85, and is pivoted to the latter by a pin 120. The lower end of the lever 118 is pivotally connected to the machine frame by a shock absorbing connection 121 which will be presently described. The above construction is such that rotation of the crank 115 from the position thereof shown in Figure 5 of the drawings, and throughout 180° of travel moves the slide 57 from its inoperative position adjacent the rear end of the machine to its forwardmost position wherein the glass panel occupies its final position in the frame 50. In fact the parts are so designed that the glass panel 51 is set in the frame 50 just before the crank approaches the end of its travel.

The shock absorbing connection 121 serves to enable continued movement of the crank 115 without jamming the parts or injuring the glass panel 51. As shown in Figure 40 of the drawings, the shock absorbing connection 121 comprises a rearwardly opening U-shaped bracket 122 having the extremities of the arms 123 suitably pivoted to the machine frame 59. Supported between the arms 123 for movement toward and away from the base portion 124 of the bracket 121 is a plate 125 having means slidably supporting pins 126. The pins 126 are also slidably supported in openings formed in the base 124, and the front ends of the pins are secured to a plate 127. The plate 127 is positioned at the front side of the base 124 of the bracket 121, and is normally urged into engagement with the base 124 by coil springs 128 respectively supported on the pins 126. The front ends of the coil springs abut the base 124 of the bracket 121, and the rear ends of the springs abut the plate 125 to yieldably urge the plate 127 against the base 124 of the bracket. The plate 127 is secured intermediate opposite ends to one end of a link 129 having the opposite end pivoted to the lower end of the lever 118 by a pin 130 shown in Figure 5 of the drawings. The arrangement is such that the lever 118 swings in a forward direction about the pivot pin 130 until the glass panel 51 is set in its final position within the frame 50. Any continued movement of the lever 118 in a forward direction by the crank arm 115 merely compresses the springs 128, and thereby prevents applying undue stress on the glass panel. In practice it is preferred to provide for a limited movement of the lever 118 in the above direction in order to compress the springs 128. This action yieldably urges the sealing strip against the frame and assists in imparting a final set to the sealing strip.

As previously described the shaft 79 on which the crank arm 115 is secured is continuously rotated by the drive shaft 75 so that the slide 57 is returned to its inoperative position shown in Figure 5 of the drawings after the glass panel 51 has been set within the frame 50. It will also be understood that the cam 65 on the shaft 66 is so timed with respect to the rotation of the shaft 79 that the slide 57 commences its forward travel as soon as a glass panel 51 is positioned thereon.

*Frame holding fixture*

The frame holding fixture 58 is supported on the machine frame 59 adjacent the front end of the latter, and is shown in Figures 1, 4, 5, 34, 36 and 37. More particularly it will be noted that the portion of the machine frame on which the fixture 58 is supported comprises a bottom plate 130 and a top plate 131 secured in vertical spaced relationship to the bottom plate by blocks 132. Suitably secured to the plate 131 are spaced pads 133 having portions 134 on which the ventilator frame 50 is seated. The ventilator frame is laterally positioned on the pads by means of blocks 135 secured to the top surfaces of the pads 133 adjacent the portions 134. The inner surfaces 136 of the blocks 135 are flared outwardly to guide the ventilator frame 50 into position on the seating portions 134 of the pads 133. The construction is such as to support the ventilator frame 50 in a horizontal plane including the plane of the glass panel 51 when the latter is positioned on the slide 57.

The ventilator frame 50 is supported by the fixture 58 with its open rear side facing the slide 57, and provision is made herein for holding the ventilator frame 50 against shifting movement in a rearward direction relative to the seating portions 134. As shown in Figure 37 of the drawings a pair of posts 137 are respectively secured to the plates 130 and 131 at opposite sides of the path of travel of the slide 57. Also it will be noted from Figure 2 of the drawings that the posts 137 are positioned immediately adjacent the rear side of the ventilator frame 50, and are formed with slots 138 to provide clearance for the opposite side edges of the glass panel 51 as the latter enters the frame 50. Referring again to Figure 37 of the drawings, it will be noted that a pair of stops 139 are respectively pivotally supported on the posts 137 at the front sides of the latter. The stops 139 normally assume positions in overlapping relationship to the slots 138, and serve to engage the adjacent ends of the frame 50 to prevent rearward shifting movement of the frame in the fixture 58. The stops 139 are held in their normal positions by pins 140 respectively secured to the front sides of the posts 137 in positions to engage shoulders 141 on the stops 139. It will be understood from the above that as the glass panel 51 enters the slots 138, the stops 139 must be swung out of obstructing relationship to the slots, and this is accomplished by forming cam surfaces on the portions of the stops 139 which register with the slots 138. These cam portions coact with the adjacent edges of the glass panel 51 to swing the stops 139 to their inoperative positions shown in Figure 37 of the drawings, and thereby enable free movement of the glass panel 51 into the frame 50.

During the setting of the glass panel 51 within the frame 50 the latter is firmly clamped against the pads 133, and for accomplishing this result, a plurality of clamping fingers 142 are provided. As shown in Figures 33 and 34 of the drawings, the clamping fingers 142 extend upwardly through openings 143 in the frame plate 131, and occupy positions in recesses 144 formed in the pads 133 and blocks 135. Each clamping finger 142 is pivoted at the lower end to the inner end of a link 145, and the outer end of the link is pivoted to a bracket 146 depending from the frame plate 131. Each link 145 is urged in a downward direction by a plunger 147 slidably supported in a cage 148 and urged into engagement with the link 145 by a spring 149.

The fingers 142 are each formed with an inwardly extending arm 150, and this arm is adapted to engage the upper side of the frame 50 upon downward displacement of the finger. In this connection it will be noted that each finger is fashioned with a cam portion 151 engageable with a cam plate 152 suitably secured to the frame plate 131. The cam surfaces 151 on the fingers cooperate with the associated plates 152 to swing the fingers inwardly with respect to the frame 50 upon downward displacement of the fingers by the springs 149, and in addition, the cam surfaces 151 serve to lock the fingers in their clamping positions with respect to the frame 50, as clearly shown in Figure 33 of the drawings.

The fingers 142 are released from clamping engagement with the frame 50 by a plate 153 supported between the frame plates 130 and 131 directly below the lower ends of the fingers. The plate 153 is secured to the upper end of a vertically movable plunger 154, and the lower end of the plunger is slidably engaged by a guide 155 fixed to the machine frame 59, as shown in Figure 19 of the drawings. It will also be observed from this figure of the drawings that a follower 156 is rotatably supported at the extreme lower end of the plunger 154 in a position to engage the periphery of a cam 157. Referring now more in detail to Figure 18 of the drawings it will be noted that the cam 157 is secured to a shaft 158 having the opposite ends suitably journalled in the machine frame 59 and having a gear 159 secured to one end thereof. As shown in Figure 4 of the drawings the gear 159 meshes with a gear 160, and the latter in turn meshes with a gear 161. The gear 161 is secured to a shaft 162, and meshes with the gear 80 on the shaft 79. Thus the cam 157 is driven by the shaft 79 in timed relation to the latter. The contour of the cam 157 is determined to move the plunger 154 and plate 153 upwardly to release the fingers 142 from the frame 50 upon completion of the glass setting operation. Also this cam is designed to allow downward movement of the plate 153 during the interval the glass panel 51 is advanced toward the frame 50, so that by the time the glass panel approaches the frame, the latter is securely clamped to the pads 133 by the fingers 142.

*Sealing strip operating mechanism*

As shown in Figures 1 and 1A of the drawings a substantially continuous length of flexible strip material 52 is supported in the form of a roll 163 on a table 164 which in turn is rotatably mounted on the upper end of a vertical shaft 165. The lower end of the shaft 165 is reduced and is received in the upper end of a bushing 166. The bushing forms a part of a bracket 167 bolted or otherwise secured to the same side of the machine frame 59 occupied by the bottom bar 53 of the ventilator frame 50 when supported on the fixture 58. This side of the machine frame is designated in the several figures of the drawings by the character A and the opposite side to be subsequently referred to is indicated by the character B.

The free end of the strip is passed over a roll 168 mounted on the upper end of a vertical shaft 169 having the lower end supported on a fixed frame part 170. The part 170 extends laterally outwardly from the side A of the machine frame 59, and the outer end is positioned adjacent the periphery of the table 164 as shown in Figure 1A of the drawings. The strip 52 is guided to the roll 168 by a guide 171 secured to the part 170 and having arcuate fingers extending around a portion of the peripheral surface of the roll along opposite sides of the strip 52.

As shown particularly in Figure 35 of the drawings, the strip 52 is yieldably urged against the roll 168 by a roller 172 supported on the inner end of an arm 173. The arm 173 is pivoted intermediate the ends on the part 170 and a spring 174 is secured to the outer end of the arm for urging the roller 172 toward the roll 168. Also supported on the part 170 is a normally closed switch 175 having an operating plunger 176 positioned in the path of swinging movement of the outer end of the arm 173. The relationship between the switch operating plunger 176 and outer end of the arm 173 is so determined that when the roller 172 is moved by the spring 174 throughout a distance approximating the thickness of the strip 52 the plunger 176 is operated to open the switch 175. This condition exists when the strip is exhausted from the roll 163 and enables operating either a warning signal or a master control switch for the power to the machine.

From the roll 168 the strip 52 passes over a roll 177 supported at the side A of the machine frame for rotation about a vertical axis in a manner to be presently described and is located at a point between the frame supporting fixture 58 and the starting position of the slide 57, as shown in Figure 1 of the drawings. The strip 52 is pulled over the roll 177 across the path of travel of the slide 57 by an arm 178 secured to the upper end of a vertical tubular shaft 179. The shaft 179 is rotatably supported on the machine frame 59 at the side B of the path of travel of the slide 57, and is rotated in opposite directions by an arm 180 secured at one end to the lower end of the shaft 179, as shown in Figure 38 of the drawings. The opposite end of the arm 180 is pivotally coupled to one end of a link 181 having the other end pivoted to the upper end of a double arm 182 (Figures 13 and 17) having the lower end pivoted to the machine frame 59. A follower 183 is supported on the double arm 182 between the ends of the latter, and is urged into engagement with a cam 184 by a spring 185 connecting the upper end of the arm 182 to a fixed part.

The cam 184 is of a design to swing the free end of the arm 178 from its inoperative position at the side B (Figure 3) across the path of travel of the slide 57 to the side A when the slide is in its retracted position shown in Figure 1 of the drawings. When the arm 178 is in the position shown in Figure 1 of the drawings, the free end assumes a position at the rear side of the strip 52 adjacent the end thereof and cooperates with a gripper jaw 185 to tightly grip the free end of the strip 52. The jaw 185 is formed by the inner end of a finger 186 pivoted intermediate the ends on the free end of the arm 178 and having the outer end pivoted to the adjacent end of a link 187. The other end of the link 187 is pivoted to the outer end of an arm 188 having the inner end secured to the upper end of a shaft 189. As shown in Figure 38 the shaft 189 is journalled in the tubular shaft 179, and is rotated by an arm 190 having the inner end secured to the lower end of the shaft 189 below the arm 180. The outer end of the arm 190 is pivotally connected to one end of a link 191 (Figure 39), and the opposite end of the link 191 is pivotally connected to the upper end of a lever 192, as shown in Figure 15 of the drawings. The lower end of the lever 192 is pivoted to the machine frame 59 and a follower 194 is rotatably mounted on the lever 192 intermediate the ends thereof. The follower 194 is urged into engagement with a cam 195 by a spring 196 connecting the upper end of the lever 192 to a fixed part.

The cam 195 is secured to the cam shaft 66, and is of a design to swing the finger 186 on the free end of the arm 178 in a direction to engage the jaw 185 with the free end of the strip 52 after the arm 178 is swung by the cam 184 to the position shown in Figure 1 of the drawings. Subsequent to operation of the cam 195 to clamp the strip to the free end of the arm 178, the cam 184 operates to swing the arm 178 back to the side B, and as a result, pulls the strip 52 across the path of travel of the slide 57. The strip 52 is supported as it is pulled across the path of travel of the slide 57 by a guide 197, and is held in frictional contact with the roll 177 by a spring pressed pad 198. As shown in Figure 24 of the drawings the pad 198 is supported at the outer side of the roll by a pivoted arm 198', and is urged into engagement with the strip 52 by a spring 199. The guide 197 is supported at the inner side of the roll 177 in a manner to be more fully described and is gradually tapered as shown in Figure 36 of the drawings to accurately locate the strip 52 at the proper elevation relative to the path of travel of the glass panel 51.

The elevation of the guide 197 is such that when the strip 52 is pulled across the path of travel of the slide 57 between the latter and fixture 58, it assumes a position with its longitudinal center line included in the common horizontal plane occupied by the panel 51 and frame 50. Thus as the panel 51 is advanced toward the frame 50, it engages the strip 52 in the manner clearly shown in Figure 2 of the drawings. The free end of the strip 52 is held in the position shown in Figure 2 of the drawings by the arm 178 so that continued movement of the panel 51 toward the frame 50 pulls or advances the strip 52 and folds the same to some extent about the front edge portions of the panel 51.

As will be presently described the guide 197 is supported at the side A of the path of travel of the glass panel 51 for swinging movement about a vertical axis, and swings to the position thereof shown in Figure 2 of the drawings as the glass panel 51 approaches the ventilator frame 50 in the fixture 58. When the guide 197 is in the position shown in Figure 2 of the drawings, the delivery end of the guide is located immediately adjacent the rear side of the adjacent post 137, as shown in Figure 36 of the drawings. The slot 138 in this post is flared at the rear side of the post, and this is also true of the slot 138 in the post at the opposite side B of the path of travel of the glass panel 51. The arrangement is such that as the sealing strip is advanced by the adjacent edge of the glass panel 51, it enters the slots 138 in the posts 137, and is folded about the adjacent edges of the glass panel 51. Inasmuch as the rear ends of the frame 50 are respectively supported immediately adjacent the front sides of the posts 137 in alignment with the slots 138, it will be noted that the folded strip leaving the slots 138 immediately enters the channel of the frame 50. Thus the strip 52 assumes the channel-shaped configuration shown in Figures 45 and 46 of the drawings.

The glass panel 51 is urged laterally toward the side A of the machine frame against the guide 197 by a follower arm 200 supported at the side B of the machine frame for swinging movement about the axis of the gripper arm 178. Referring again to Figure 2 of the drawings, it will be noted that the gripper arm has an extension 201 which projects laterally inwardly from the free end of the arm and terminates in a portion 202 having an arcuate surface for engagement with the strip 52. Also the strip is held in proper relationship to the glass panel 51 by a pair of fingers 203 extending along opposite side edges of the strip 52 and secured to the portion 202.

The opposite end of the follower arm 200 is secured to the upper end of a tubular shaft 204, and the latter is shown in Figure 38 of the drawings as journalled in the machine frame 59 in concentric relation to the tubular shaft 179 for the gripper arm 178. Secured to the lower end of the shaft 204 is an arm 205 having the free end pivotally connected to one end of a link 206 in the manner shown in Figure 39 of the drawings. The opposite end of the link 206 is pivotally connected to the upper end of a lever 207 shown in Figure 16 of the drawings as having the lower end pivoted to a part of the machine frame 59 by a pin 208. A roller 209 is supported on the lever 207 intermediate the ends of the latter, and is held in frictional contact with the periphery of a cam 210 by a spring 211. The cam 210 is secured to the shaft 66, and has a contour determined to swing the arm 200 laterally inwardly as the panel 51 approaches the frame 50. When the arm 200 is swung laterally inwardly, the portion 202 on the extension 201 of the arm 200 presses the sealing strip 52 against the adjacent edge of the glass panel 51, and the fingers 203 locate the sealing strip vertically with respect to the glass panel 51. As the glass panel 51 is advanced relative to the arm 200, the latter is swung outwardly by the cam 210 at a rate to permit the portion 202 to follow along the arcuate front edge portion of the panel 51 in the manner shown in Figure 2 of the drawings.

Summarizing the foregoing, it will be noted that the three cams 184, 195 and 210 are secured to the cam shaft 66 for operation by the latter. These cams are developed with respect to movement of the slide 57, and operate the strip pulling mechanism in timed relation to movement of the slide. Briefly the cam 184 swings the gripper arm 178 from the position thereof shown in Figure 3 of the position shown in Figure 1 when the slide 57 is in its retracted position. The cam 195 operates the jaw 185 to clamp the free edge of the strip 52 to the arm 178 when the latter is in its innermost position shown in Figure 1. The cam 184 then returns the gripper arm 178 to its outermost position at the side B of the machine, and pulls the strip 52 across the path of travel of the glass panel 51 in advance of the latter. As the glass panel engages the strip 52, the cam 210 operates to swing the follower arm inwardly, and thereby positions the strip against the adjacent edge of the glass panel. As pointed out above, the follower arm 200 is moved along the adjacent edge of the panel by the cam 210 as the glass panel continues its movement toward the frame 50, and accurately centers the strip 52 with respect to the adjacent edge of the panel 51.

When the strip 52 has been pulled across the path of travel of the glass panel, it is desirable to hold the table 164 against further rotation, and this is accomplished by a brake 212 shown in Figure 22 of the drawings. The brake 212 comprises an arm 213 pivoted intermediate the ends on the bracket 167 and having a part 214 positioned on the free end thereof to frictionally engage the underside of the table 164 upon swinging movement of the free end of the arm 213 in an upward direction. The rear end of the arm 213 is connected to the upper end of a vertical shaft 215 slidably supported on the machine frame by a bracket 216. As shown in Figure 28 of the drawings the lower end of the shaft 215 engages the periphery of a cam 217, and is frictionally held in engagement with the cam by a spring 218. The design of the cam 217 is such that when the strip 52 has been pulled across the path of travel of the glass panel 51, the arm 213 is rocked in a direction to engage the part 214 with the table 164. Thus the table is prevented from rotation, and undue slack in the strip is avoided. However, as soon as the front edge of the glass panel 51 contacts the strip 52, the cam 217 is operated to release the brake on the table 164 and permit continued feeding of the strip 52. The brake 212 is held in its released position by the cam 217 until the glass panel 51 is completely set in the frame 50. When this condition exists, the cam 217 again operates to apply the brake 212 and prevent rotation of the table 164.

In some instances it may be advantageous to apply a lubricant such as soap and water to the strip 52 as the latter passes over the roll 177. This is accomplished by a conduit 219 having one end connected to a suitable lubricant supply and having the other end positioned adjacent the periphery of the roll 177. The excess lubricant is collected in a pan 220 suitably supported on the machine frame below the roll 177.

As shown in Figures 23 to 25 inclusive, the guide 197 is formed of two sections 221 and is supported with the sections spaced from each other in a vertical plane. In detail the sections 221 are respectively secured to vertically spaced blocks 222 supported for vertical sliding movement relative to one another on a bracket 223, shown in Figures 22 and 36 of the drawings. In detail the bracket 223 comprises vertically spaced plates 224 connected together at one side by a vertically extending rib 225. The rib 225 is wedge-shaped in cross section and slidably engages in vertically aligned correspondingly shaped recesses 226 formed in the blocks 222. As shown particularly in Figure 23 of the drawings, the blocks 222 are formed with aligned bores 227, which are oppositely threaded and respectively engage a screw 228. The screw 228 extends upwardly to the top plate 224 of the bracket 223, and an operating knob 229 is secured to the upper end thereof. The arrangement is such that manipulation of the knob 229 varies the effective width of the guide 197, and enables accommodating strips 52 of different width.

As shown in Figure 22 of the drawings the vertically spaced plates 224 on the bracket 223 are slidably supported on a vertical shaft 230 which also rotatably supports the guide roll 177. In fact the guide roll 177 is supported on the shaft 230 between the plates 224 and assumes a position in registration with the guide 197. The lower end of the shaft 230 is rotatably supported in a part of the machine frame 59. Secured to the lower end of the shaft 230 is an arm 231, and the free end of the arm is connected to the upper end of a lever 232 by a chain 233 in the manner clearly shown in Figures 27 and 31 of the drawings. The lower end of the lever 232 is pivoted to the machine frame by a pin 234, and a roller 235 is connected to the arm intermediate the ends thereof. The roller is held in frictional contact with the periphery of a cam 236 by a spring 237, and the cam is secured to the shaft 162 for rotation by the latter. The cam 236 periodically rotates the shaft in opposite directions about its axis, and in the present instance, the bottom plate 224 of the bracket 223 is keyed to the shaft so as to rotate as a unit with the latter. Inasmuch as the guide 197 is secured to the bracket 223, it follows that the guide also rotates with the shaft, and the contour of the cam 236 is determined to swing the guide 197 from the position thereof shown in Figure 1 of the drawings to the position shown in Figure 3 of the drawings when the glass panel 51 initially contacts the sealing strip 52. As pointed out above when the guide 197 is in the position shown in Figure 3, it serves to guide the strip 52 into the slot 138 formed on the post 137 located adjacent the bottom side 53 of the ventilator frame 50.

The bracket 223 and roll 177 are supported on the shaft 230 for vertical sliding movement to enable vertically adjusting the strip 52 relative to the glass panel 51. For example, when assembling a ventilator window of the type shown in Figure 45 of the drawings, it is desirable to raise the strip 52 slightly during the final setting operation in order to provide the increased width of the strip adjacent the handle attaching portion 56 on the ventilator frame 50. On the other hand if a ventilator window of the opposite hand is assembled in the apparatus, it is desirable to lower the strip 52 during the final setting operation to provide a greater width of strip at the opposite side of the ventilator frame 50.

With the above in view reference is again made to Figure 22 of the drawings, wherein it will be noted that a plate 240 is secured to the underside of the plate 224 by suitable pins 241. The plate 240 is spaced above the bearing block 242 for the lower end of the shaft 230, and a ball 243 is interposed between the plate 240 and top surface of the bearing block 242. A development view of the above parts is shown in Figure 32 of the drawings, and it will be noted that the ball 243 is seated in a recess 244 formed in the top face of the block 242. The plate 240 seats on the ball 243, and is held against the ball by a spring 245 surrounding the upper end of the shaft 230 between the top plate 224 on the bracket 223 and a fixed stop 246 secured to the upper end of the shaft 230.

The ball engaging surface of the plate 240 has four circumferentially spaced cam portions designated in Figure 30 of the drawings by the numerals 247, 248, 249 and 250. In the present instance the ball 243 is positioned by the recess 244 in engagement with the cam portion 248 on the plate 240, so that rotation of the plate 240 in the direction of the arrow shown in Figure 32 of the drawings advances the raised cam portion 249 in registration with the ball and lifts the bracket 223 relative to the shaft 230. The roll 177 and guide 197 move upwardly with the bracket to increase the width of the portion of the strip extending above the plane of the glass panel 51. When the shaft 230 is returned by its operating cam 236, the plate 240 is rotated in the opposite direction to again register the cam portion 248 with the ball 243.

Assuming now that it is desired to supply a greater width of the strip below the plane of the glass panel 51, the ball 243 is angularly adjusted to assume a position in a second recess 251 formed in the top of the block 242. This adjustment of the ball registers the latter with the raised cam face 249, and the depth of the recess 251 is sufficiently greater than the depth of the recess 254 to compensate for the elevation of the cam portion 249. Thus regardless of whether the ball is supported in the recess 244 or in the recess 251, the bracket 223 remains at the same elevation. However, rotation of the plate 240 by the shaft 230 in the direction of the arrow shown in Figure 32 of the drawings registers the depressed cam surface 250 with the ball in the recess 251 and allows the bracket 223 with its associated parts to drop slightly. This of course lowers the guide 197 to locate a greater width of the strip 52 below the plane of the glass panel 51. Of course return movement of the shaft 230 again registers the ball in the recess 251 with the raised cam portion 249 and lifts the bracket to again center the strip laterally with respect to the glass panel 51.

The ball 243 may also be adjusted to assume a position in a third recess 252 formed in the block 242. When the ball is in the recess 252 it registers with the cam portion 247 on the plate 240, and the depth of this recess is determined in such a manner that when the ball 243 contacts the cam portion 247, the guide 197 is in a position to support the strip with its longitudinal center line in the plane of the glass panel 51. In other words the same width of the sealing strip extends above and below the glass panel. This arrangement is desirable when assembling a ventilator window of the type shown in Figure 46 of the drawings. It will be noted from Figure 30 of the drawings that the cam surface 247 extends for the full angular travel of the bracket 223 by the shaft 230, so that a strip 52 is retained in its position with respect to the glass panel 51 throughout the complete cycle of operation.

The ball 243 is angularly adjusted to assume a position in any one of the recesses formed in the top surface of the block 242 by a cage 253 mounted for rotation about the shaft 230 between the plate 240 and the block 242. The cage has an opening 254 for freely receiving the ball 243, and is adapted for manual adjustment, depending upon the type of ventilator window to be assembled.

Strip cut-off mechanism

After the glass panel 51 is finally set in the frame 50 the strip 52 is severed by a knife 255 shown in Figures 37, 41, 42 and 43 of the drawings. The knife is located to cut the strip 52 at the rear end of the bottom bar 53 of the ventilator frame 50 and is supported on the adjacent post 137 at the front side of the latter. In detail a shaft 256 is journaled in a base 257 formed in the post 137 and is also supported on the machine frame 59 by a bracket 258, spaced rearwardly from the post 137. A head 259 is formed on the front end of the shaft 256 and a cap 260 is secured to a flat on the periphery of the head by a screw 261. The rear face of the head 259 adjoining the flattened peripheral portion is is formed with an undercut groove 262 and a similar groove is formed in the cap 260 in registration with the groove 262. The two grooves cooperate to form a recess for receiving the knife 255 and the latter is removably clamped in place by the cap 260.

The knife 255 is in the form of a flat elongated bar shown in Figure 37 of the drawings as positioned at the laterally inner side of the adjacent post 137 and as extending upwardly beyond the head 259 a sufficient distance to swing outwardly across the delivery end of the slot 138 in the adjacent post 137. A cutting edge 263 is formed on the outer edge of the knife 255 adjacent the upper end of the latter in a position to sever the strip 52 in response to swinging the knife from the position shown in Figure 41 to the position shown in Figure 42 of the drawings.

The knife 255 is operated by a cam 264 shown in Figures 18 and 21 of the drawings as secured to the cam shaft 158. The peripheral edge of the cam 264 is engaged by a roller 265 carried by a lever 266 intermediate the ends thereof and having one end pivoted to the machine frame 59 by a pin 267. The free end of the lever 266 is pivoted to the lower end of a rod 268 having the upper end (Figure 43) extending between the furcations of a bifurcated link 269 and pivoted to the latter intermediate the ends thereof by a pin 270. One end of the link 269 is keyed to the shaft 256 between the bracket 258 and adjacent post 137 while the other end of the link is connected to the upper end of a spring 271 having the lower end anchored on the frame 59. The spring 271 acts to yieldably hold the roller 265 in contact with the cam 264.

The peripheral contour of the cam 264 is determined to swing the knife 255 to the position shown in Figure 42 of the drawings to sever the strip 52 after the glass panel 51 is moved to its final setting position within the frame 50. The cam 264 also cooperates with the spring 271 to retract the knife 255 to its inoperative position shown in Figure 41 of the drawings subsequent to the cutting operation. As shown in Figure 21 of the drawings a lever 272 is pivoted intermediate the ends on the back of the cam 264. The inner end of the lever is held in engagement with the shaft 158 by a spring 273 and a lip 274 is formed on the outer end of the lever. The lip 274 forms a continuation of the peripheral surface of the cam 264 and acts to yieldably resist movement of the follower 265 outwardly to retract the knife 255. Thus, the knife is momentarily retained in its cutting position and severing of the strip 52 is assured.

Ejecting mechanism

The ejecting mechanism is shown in Figure 20 of the drawing and operates to lift the ventilator window out of the fixture 58 upon completion of the severing operation. This mechanism comprises a rod 275 supported for vertical sliding movement and having the upper end extending through aligned openings in the plates 130, 131 and 153. The upper end of the rod assumes a position directly below the glass panel 51 and is equipped with a bumper 276 for engagement with the under side of the panel 51. The lower end of the rod 275 is pivoted to the free end of a lever 277 having the opposite end pivoted in the frame 59 by a pin 267. A follower 279 in the form of a roller is also supported on the free end of the lever 277 and is urged by a spring 280 into engagement with the peripheral edge of a cam 281. The cam 281 is secured to the cam shaft 158 for rotation by the latter and the contour of the cam is determined to successively raise and lower the rod 275 upon one complete revolution of the cam. The rod 275 is raised to lift the ventilator assembly sufficiently from the fixture 58 to enable readily removing the same and is lowered or returned to its inoperative position shown in Figure 20 of the drawing, in ample time before the next cycle of operation.

Operation

Although the operation of the apparatus is defined in some detail above, nevertheless, a brief summary of the operation is as follows: Let it be assumed that a ventilator frame 50 is supported on the fixture 58 and that a glass panel 51 is supported on the fixture 56. At the start of the cycle of operation the slide 57 is in its retracted position and the free end of the strip 52 extends a slight distance beyond the guide 197. The cam 65 (Figure 14) operates to swing the fixture 56 downwardly from the raised position shown in Figure 6 of the drawings and places the glass panel 51 on the slide 57 in advance of the bumper bar 97. The slide 57 is advanced toward the fixture 58 or frame 50 by the crank 115 (Figure 5) and the bar 97 moves the glass panel 51 as a unit with the slide. Upon initial movement of the panel 51 toward the frame 50 the panel is disengaged from the fixture 56 and the cam 65 returns the fixture 56 to its raised position shown in Figure 6 of the drawings enabling another panel 51 to be loaded on the fixture in readiness for the next cycle of operation.

During the above operation the cam 184 (Figure 17) swings the gripper arm 178 from the position shown in Figure 3 to the position shown in Figure 1 of the drawings and the cam 195 (Figure 15) operates the jaw 185 to clamp the free end of the strip 52 to the free end of the arm 178. Continued rotation of the cam 184 returns the arm 178 and pulls the strip 52 across the path of travel of the slide 57 in advance of the glass panel 51. During this operation the guide 197 extends inwardly toward the path of travel of the slide in the manner shown in Figure 1 of the drawings and cooperates with the arm 178 to support the strip 52 in a position with its center line lying in the plane of the panel 51. Immediately after the strip 52 is pulled across the path of travel of the slide 57 by the arm 178, the cam 217 (Figures 22 and 28) operates the arm 213 to engage the element 214 with the table 164. Thus, further rotation of the table is prevented and the strip is held taut across the path of travel of the slide 57.

As the slide 57 continues its movement toward the frame 50 or fixture 58 the front edge portion of the panel 51 contacts the strip 52 and the cam 256 (Figures 22 and 27) rotates the guide 197 about the axis of the shaft 239 to the position shown in Figure 2 of the drawings. Also the cam 216 swings the follower arm 200 from its inoperative position at the side B of the machine (Figure 1) inwardly with respect to the path of travel of the slide 57. As shown in Figure 2 of the drawings the portion 202 on the follower arm 200 presses the strip against the front edge of the panel 51 and urges the bottom edge of the panel 51 against the positioning guide 197. Also the fingers 203 on the free end of the arm 200 extend across opposite side edges of the strip 52 and position the same vertically with respect to the panel 51 as the latter is advanced toward the frame 50 by the slide 57.

During the foregoing operations the cam 157 (Figure 19) lowers the plate 153 enabling the springs 149 to operate the fingers 142 (Figure 33) to securely clamp the frame 50 to the fixture 58. The frame 50 is clamped in the fixture with its open rear side facing the front edge of the panel 51 on the slide 57 and the rear ends of the frame at opposite sides thereof are respectively positioned by the members 139 in registration with the slots 138 in the posts 137.

When the slide 57 is advanced a sufficient distance to engage the panel 51 with the strip 52 the cam 217 operates to release the table 164 and permit continued feeding of the strip by the force resulting from continued advancement of the glass panel 51. During this continued movement of the panel toward the frame 50 the strip 52 is drawn around the bottom and front edges of the panel in the manner shown in Figure 2 of the drawings. As the opposite edges of the panel 51 with the adjacent portions of the strip pass through the slots 138 in the posts 137, the frame positioning members 139 are swung upwardly and the strip 52 is channeled to permit insertion of the same into the channels of the adjacent bars of the frame 50. During the above operation the cam 210 swings the follower arm 200 out of contact with the glass panel 51 and the cam 112 on the bumper bar 97 engages the projection 114 on the machine frame 59. As a result the bar 97 is shifted laterally with respect to the path of travel of the slide 57 in a direction to urge the bottom edge of the panel into intimate contact with the guide 197. This arrangement assures aligning the bottom edge of the panel 51 with the bottom bar 53 of the frame 50.

As the shaft 230 is rotated by the cam 256 to swing the guide 197 to the position shown in Figure 2 of the drawings the guide may be raised or lowered depending upon the type of ventilator being assembled. In Figure 45 of the drawings a right hand ventilator assembly is shown wherein the portion 56 of the inner flange on the bottom frame bar is of greater width than the outer flange to accommodate the operating handle. Accordingly the guide 197 is raised to provide a greater width of the strip above the plane of the panel 51. When a similar ventilator assembly of the opposite hand is assembled in the apparatus, the guide 197 is lowered to provide a greater width of the strip below the plane of the panel 51. The manner in which both of the above operations may be accomplished is described in detail above in connection with Figures 29, 30, and 32 of the drawings.

After the glass panel 51 is fully set within the frame 50, the cam 264 operates the knife 255 to cut the strip 52 at the rear end of the bottom bar 53 of the frame 50 in the manner clearly described above. It is to be noted, however, that the knife is operated by the cam 264, the slide 57 is retracted sufficiently to provide the necessary clearance for the knife. Prior to the time the strip 52 is severed by the knife 255, the jaw 185 is operated by the cam 195 to release the end of the strip 52. Also the plate 153 is raised by the cam 157 (Figure 19) to release the fingers 142 from the frame 50, and the plunger 275 is operated by the cam 281 (Figure 20) to raise the ventilator assembly from the fixture 58. During the above operations the slide 57 is returned to its retracted position (Figure 1) and the foregoing cycle is repeated.

What I claim as my invention is:

1. In apparatus for assembling a panel in a frame having an open side for receiving the panel and for also setting a sealing strip within the frame around the adjacent marginal edges of the panel, a supporting structure, a slide supported on said structure and having means for supporting the panel, a fixture mounted on the structure and having means for supporting the frame in a plane including the panel with the open side of the frame facing toward the panel, means for moving the slide toward the fixture to insert the panel into the frame through the open side of the latter, means supporting a substantially continuous length of flexible sealing strip material to one side of the path of travel of the slide, means operating in timed relation to movement of the slide for grasping one end of the strip and for pulling a predetermined length of the strip across the path of travel of the slide between the panel and frame for engagement by the adjacent edge of the panel as it advances toward the frame, means for folding the strip around the adjacent marginal edges of the panel as the latter moves into the frame, means operating in timed relation to final setting of the panel in the frame to release said gripping means from the end of the strip, and means also operating in timed relation to the final setting of the panel in the frame to sever the length of the strip seated within the frame from the remainder of the strip.

2. In apparatus for assembling a panel in a frame having an open side for receiving the panel and for also setting a sealing strip within the frame around the adjacent marginal edges of the panel, a supporting structure, a part mounted on the supporting structure and having means for supporting the panel, a second part mounted on the supporting structure in spaced relation to the first part and having means for supporting the panel frame with the open side facing toward the panel, power operated means for relatively moving the parts toward one another to insert the panel into the frame through the open side of the latter, power means connected to the power operated means for operating the latter and having control means for rendering said power means operative and inoperative, means for supporting a substantially continuous length of flexible sealing strip material to one side of the path of relative movement of the panel and frame, means operated by the power operated means for gripping one end of the strip and for pulling the strip across the path aforesaid between the panel and frame for engagement by the panel, and means for actuating said control means to render said power means inoperative in response to pulling the final length of strip by the gripping means.

3. In apparatus for assembling a panel in a frame having an open side for receiving the panel and for also setting a sealing strip within the frame around the adjacent marginal edges of the panel, a supporting structure, a slide supported on said structure and having means for supporting the panel, a fixture mounted on the structure and having means for supporting the frame in a plane including the panel with the open side of the frame facing toward the panel, means for moving the slide toward the fixture to insert the panel into the frame through the open side of the latter, means supporting a substantially continuous length of flexible sealing strip material to one side of the path of travel of the slide, an arm supported at the opposite side of the path of travel of the slide for swinging movement, means operated in timed relation to movement of the slide for swinging the arm across the path aforesaid and for subsequently returning the arm, a member movable with said arm and cooperating with a part of said arm to form gripping jaws, and means for operating the member to grip the end of the strip prior to return movement of the arm.

4. In apparatus for assembling a panel in a frame having an open side for receiving the panel and for also setting a sealing strip within the frame around the adjacent marginal edge of the panel, a supporting structure, a slide on the supporting structure and having means for supporting the panel, a fixture also on the supporting structure and having means for supporting the frame with the open side facing the panel, means for moving the slide toward the frame to insert the panel into the frame through the open side thereof, means for extending a length of the sealing strip across the path of travel of the slide between the panel and open side of the frame in a position to be engaged intermediate the opposite longitudinal edges by the leading edge of the panel, a guide for the strip supported at one side of the path of travel of the slide and extending transversely of the path of travel for supporting the strip in the position aforesaid, means operated in timed relation to engagement of the leading edge of the panel with the strip to swing the guide to a position in substantial alignment with the adjacent side of the frame, and means operated in timed relation to swinging movement of the guide to urge the panel laterally against the guide.

5. In apparatus for assembling a panel in a frame having an open side for receiving the panel and for also setting a sealing strip within the frame around the adjacent marginal edge of the panel, a supporting structure, a slide on the supporting structure and having means for supporting the panel, a fixture also on the supporting structure and having means for supporting the frame with the open side facing the panel, means for moving the slide toward the frame to insert the panel into the frame through the open side thereof, means for extending a length of the sealing strip across the path of travel of the slide between the panel and open side of the frame in a position to be engaged intermediate the opposite longitudinal edges by the leading edge of the panel, a guide for the strip supported at one side of the path of travel of the slide and extending transversely of the path of travel for supporting the strip in the position aforesaid, means operated in timed relation to engagement of the leading edge of the panel with the strip to swing the guide to a position in substantial alignment with the adjacent side of the frame, and means operated in timed relation to continued advancement of the panel toward the frame to vertically adjust the guide and vary the elevation of the adjacent portion of the strip relative to the panel.

6. In apparatus for assembling a sealing strip on adjacent marginal edges of a panel, means for advancing the panel along a predetermined path, means for supporting a length of the sealing strip at one side of the path of travel, an arm supported on the opposite side of the path of travel for swinging movement in a plane parallel to the path of travel, means operating in timed relation to movement of the panel for swinging the free end of the arm across the path of travel in advance of the panel and subsequently returning the arm, means movable with said arm and operable to grip the free end of the strip prior to return movement of the arm whereby the strip is pulled across the path of travel in advance of the panel as the arm is returned, and means for supporting the strip in a vertical position to be engaged intermediate opposite longitudinal edges thereof by the leading edge of the panel as the latter advances along said path.

7. In apparatus for assembly a sealing strip on adjacent marginal edges of a panel, means for advancing the panel along a predetermined path, means for supporting a length of the sealing strip at one side of the path of travel, an arm supported on the opposite side of the path of travel for swinging movement in a plane parallel to the path of travel, means operating in timed relation to movement of the panel for swinging the free end of the arm across the path of travel in advance of the panel and for subsequently returning the arm, a gripping jaw supported on the swinging end of the arm for movement with the latter, a guide for supporting the free end of the strip in a position to be received between the jaw and adjacent part of the arm upon swinging movement thereof to the side of the path of travel on which the strip is supported, and means for operating the jaw to grip the free end of the strip prior to return movement of the arm.

8. In apparatus for assembling a sealing strip on adjacent marginal edges of a panel, means for advancing the panel along a predetermined path, means for supporting a length of the sealing strip at one side of the path of travel, an arm supported on the opposite side of the path of travel for swinging movement in a plane parallel to the path of travel, means operating in timed relation to movement of the panel for swinging the free end of the arm across the path of travel in advance of the panel and for subsequently returning the arm, means movable with said arm and operable to grip the free end of the strip prior to return movement of the arm whereby the strip is pulled across the path of travel in advance of the panel as the arm is returned, and means operating in timed relation to movement of the panel into engagement with the strip for vertically positioning the strip relative to the leading edge of the panel.

9. In apparatus for assembling a sealing strip on adjacent marginal edges of a panel, means for advancing the panel along a predetermined path, means for supporting a length of the sealing strip at one side of the path of travel, an arm supported on the opposite side of the path of travel for swinging movement in a plane parallel to the path of travel, means operating in timed relation to movement of the panel for swinging the free end of the arm across the path of travel in advance of the panel and for subsequently returning the arm, means movable with said arm and operable to grip the free end of the strip prior to return movement of the arm whereby the strip is pulled across the path of travel in advance of the panel as the arm is returned, a second arm supported at the same side of the path of travel of the panel as the first arm for swinging movement in a plane parallel to the plane of movement of the first arm, means operating in timed relation to movement of the panel into engagement with the strip to swing the second arm toward the adjacent edge of the panel, and means at the free end of the second arm for vertically positioning the strip relative to the adjacent edge aforesaid of the panel and for pressing the strip against the latter edge.

10. In apparatus for assembling a sealing strip on adjacent marginal edges of a panel, means for advancing the panel along a predetermined path, means for supporting a length of the sealing strip at one side of the path of travel, means operating in timed relation to movement of the panel in one direction to pull a length of the sealing strip across the path of travel of the panel in advance of the latter, means for supporting the strip in a position to be engaged by the leading edge of the panel along a line intermediate the opposite longitudinal edges of the strip, said strip supporting means including a guide supported at the one side aforesaid of the path of travel for swinging movement about an axis perpendicular to the plane of advancement of the panel and normally extending transversely to said path of travel in the direction of movement of the strip by the pulling means, and means operating in timed relation to engagement of the strip by the leading edge of the panel to swing the guide to a position wherein it extends generally parallel to the path of travel of the panel.

11. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, a guide supported at one side of the path of travel for guiding the strip in relation to the adjacent edge of the panel, and means for vertically adjusting the guide to vary the elevation of the adjacent portion of the strip relative to the panel.

12. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, a guide supported at one side of the path of travel for guiding the strip in relation to the adjacent edge of the panel, and means operated in timed relation to advancement of the panel toward the strip to press the strip against the leading edge of the panel and to shift the panel laterally against the guide.

13. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, a guide supported at one side of the path of travel for guiding the strip in relation to the adjacent edge of the panel, an arm supported at the opposite side of the path of travel of the panel for swinging movement in a plane generally parallel to the plane of movement of the panel, means operated in timed relation to advancement of the panel toward the strip to swing the arm toward and away from the adjacent edge of the panel, means on the arm for pressing the strip against the said adjacent edge of the panel and for shifting the panel laterally against the guide, and means operating in timed relation to swinging movement of the arm in a direction away from the panel to maintain the latter in position against the guide.

14. In apparatus for assembling a sealing strip on an adjacent marginal edge of a panel, means for advancing the panel along a predetermined path of travel, a guide supported to one side of the path of travel for locating a length of the sealing strip in a plane perpendicular to the plane of the panel and in a position adjacent one edge of the panel, and means operated in timed relation to advancement of the panel for adjusting the guide to vary the location of the strip in said perpendicular plane relative to the panel.

15. In apparatus for assembling a sealing strip on adjacent marginal edges of a panel, means for advancing the panel along a predetermined path, means for supporting a length of the sealing strip at one side of the path of travel, means operating in timed relation to movement of the panel in one direction to pull a length of the sealing strip across the path of travel of the panel in advance of the latter, means for supporting the strip in a position to be engaged by the leading edge of the panel along a line intermediate the opposite longitudinal edges of the strip, said strip supporting means including a guide supported at the one side aforesaid of the path of travel for swinging movement about an axis perpendicular to the plane of advancement of the panel and normally extending transversely to said path of travel in the direction of movement of the strip by the pulling means, means operating in timed relation to engagement of the strip by the leading edge of the panel to swing the guide to a position wherein it extends generally parallel to the path of travel and acts to guide the strip along the adjacent edge of the panel, and means responsive to swinging movement of the guide to vary the elevation of the latter and thereby change the elevation of the strip relative to the adjacent edge of the panel.

16. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, a guide for the strip extending transversely of the path of travel in the general direction of the strip, means operated in timed relation to advancement of the panel into engagement with the strip to swing the guide to a position in substantially parallel relation to the path of travel to guide the strip along the adjacent edge of the panel, and means responsive to swinging movement of the guide to change the elevation of the latter and thereby vary the elevation of the strip relative to the adjacent edge of the panel.

17. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, a guide for the strip extending transversely of the path of travel in the general direction of the strip, a pivotal mounting for the guide at one side of the path of travel including a rotatable shaft supported in a vertical position, a bracket slidably and non-rotatably mounted on the shaft and connected to the guide, means operating in timed relation to advancement of the panel into engagement with the strip to rotate the shaft in a direction to locate the guide along one side of the path of travel, and means for adjusting the bracket along the shaft to vary the elevation of the guide and the strip engaged thereby.

18. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, said strip supporting means including a guide supported at one side of the path of travel for swinging movement about an axis perpendicular to the plane of advancement of the panel and normally extending transversely of said path of travel in the general direction of the strip, and means operating in timed relation to engagement of the strip by the leading edge of the panel to swing said guide to a position wherein it extends generally parallel to the path of travel of the panel.

19. In apparatus for assembling a sealing strip on adjacent marginal edges of a panel, means for advancing the panel along a predetermined path, means supporting a length of the sealing strip across the path of travel of the panel in a position to be engaged by the leading edge of the panel along a line between the opposite longitudinal edges of the strip, said strip supporting means including a guide extending transversely of said path of travel in the general direction of the strip, and means operating in timed relation to engagement of the strip by the leading edge of the panel to swing said guide to a position wherein it extends generally parallel to the path of travel of the panel.

20. In apparatus for assembling a panel in a frame having an open side for receiving the panel and for also setting a sealing strip within the frame around the adjacent marginal edge of the panel, a supporting structure, a part mounted on the supporting structure and having means for supporting the panel, a second part also mounted on the supporting structure and having means for supporting the frame with the open side facing the panel, means for relatively moving said parts toward each other to insert the panel into the frame through the open side thereof, means supporting a length of the sealing strip across the path of relative movement of said parts in a position to be engaged along a line intermediate the opposite longitudinal edges by the leading edge of the panel, a guide supported at one side of the path of relative movement for guiding the strip in relation to the adjacent edge of the panel, and means for vertically adjusting the guide to vary the elevation of the adjacent portion of the strip relative to the panel.

HENRY W. MACKEY.

References Cited in the file of this patent
UNITED STATES PATENTS

| Number | Name | Date |
| --- | --- | --- |
| 985,803 | Hodgkinson | Mar. 7, 1911 |
| 1,243,728 | Gagnon | Oct. 23, 1917 |
| 1,587,855 | Redding | June 8, 1926 |
| 1,712,907 | Stenhouse | May 14, 1929 |
| 1,801,309 | Gipe | Apr. 21, 1931 |
| 1,802,597 | Glazer | Apr. 28, 1931 |
| 1,955,630 | Hall | Apr. 17, 1934 |
| 2,167,728 | Satrangno | Aug. 1, 1939 |
| 2,209,724 | Bodkin | July 30, 1940 |
| 2,244,268 | Smeltzly | June 3, 1941 |
| 2,268,625 | Sigoda | Jan. 6, 1942 |
| 2,305,995 | Roberts | Dec. 22, 1942 |
| 2,373,082 | Staelin | Apr. 3, 1945 |
| 2,457,766 | Young | Dec. 28, 1948 |